United States Patent
Cook

(10) Patent No.: US 10,729,272 B2
(45) Date of Patent: Aug. 4, 2020

(54) MODULAR GRILL AND SMOKER, SUPPORT STRUCTURES AND USER DEVICE INTEGRATION

(71) Applicant: Elliot C. R. Cook, Westwood, CA (US)

(72) Inventor: Elliot C. R. Cook, Westwood, CA (US)

(73) Assignee: UberDesign.Com Inc., Los Angeles, CA (US)

( * ) Notice: Subject to any disclaimer, the term of this patent is extended or adjusted under 35 U.S.C. 154(b) by 0 days.

(21) Appl. No.: 15/284,348

(22) Filed: Oct. 3, 2016

(65) Prior Publication Data
US 2017/0095106 A1    Apr. 6, 2017

Related U.S. Application Data

(60) Provisional application No. 62/237,134, filed on Oct. 5, 2015.

(51) Int. Cl.
| | | |
|---|---|---|
| *A47J 27/00* | (2006.01) | |
| *A47J 37/07* | (2006.01) | |
| *A47J 36/34* | (2006.01) | |

(52) U.S. Cl.
CPC ............ *A47J 27/002* (2013.01); *A47J 36/34* (2013.01); *A47J 37/0713* (2013.01)

(58) Field of Classification Search
CPC ...... A47J 27/002; A47J 36/34; A47J 37/0713; A47J 37/07; A47J 37/074; A47J 37/0704; F24B 1/182; G06F 13/00; G06F 17/00
USPC ............ 99/473, 482; 126/25 R, 6, 19 R, 20, 126/21 A, 21 R, 273 A
See application file for complete search history.

(56) References Cited

U.S. PATENT DOCUMENTS

| | | | |
|---|---|---|---|
| 4,076,008 A * | 2/1978 | Deaton | A47J 37/00 126/25 R |
| 4,503,502 A | 3/1985 | Chapin | |
| 4,624,239 A | 11/1986 | Yellin | |
| 5,086,753 A * | 2/1992 | Berger | A47J 37/0763 126/25 R |
| 5,493,093 A | 2/1996 | Cecil | |
| 5,839,361 A | 11/1998 | Richter | |
| 6,104,004 A | 8/2000 | Ragland et al. | |
| 6,615,821 B1 | 9/2003 | Fisenko | |
| 6,868,777 B1 * | 3/2005 | Higgins | A23B 4/044 426/314 |
| 2007/0028912 A1 | 2/2007 | Gagas et al. | |
| 2007/0119444 A1 | 5/2007 | Yoon et al. | |

(Continued)

FOREIGN PATENT DOCUMENTS

WO  PCT/US2016/055216    2/2017

OTHER PUBLICATIONS

"Lotus BBQ Grill" uploaded by Garden Gift Shop on YouTube, Sep. 4, 2012, uploaded from https://www.youtube.com/watch?v=ODuNYqioj28.

*Primary Examiner* — Dana Ross
*Assistant Examiner* — James F Sims, III
(74) *Attorney, Agent, or Firm* — One LLP; Joseph K. Liu

(57) ABSTRACT

Systems, devices, and methods of use and manufacture are provided for a modular grill and smoker device for cooking food that include a first chamber, a door for opening and sealably closing the first chamber, an airflow corridor creating a hull around the first chamber for channeling air around the first chamber with at least one lower vent and at least one upper vent, as well as integration with electronic user devices.

15 Claims, 42 Drawing Sheets

(56) References Cited

U.S. PATENT DOCUMENTS

| | | | |
|---|---|---|---|
| 2010/0018516 A1* | 1/2010 | Jackovitch | A47J 37/0754 126/25 R |
| 2014/0030976 A1* | 1/2014 | Spalding | F24F 13/10 454/347 |
| 2015/0240520 A1* | 8/2015 | Ayrest | E05B 17/2019 70/344 |
| 2015/0275997 A1* | 10/2015 | Burton | E05F 5/02 267/166 |
| 2015/0305560 A1* | 10/2015 | Hamlin | A47J 37/0713 126/25 R |

\* cited by examiner

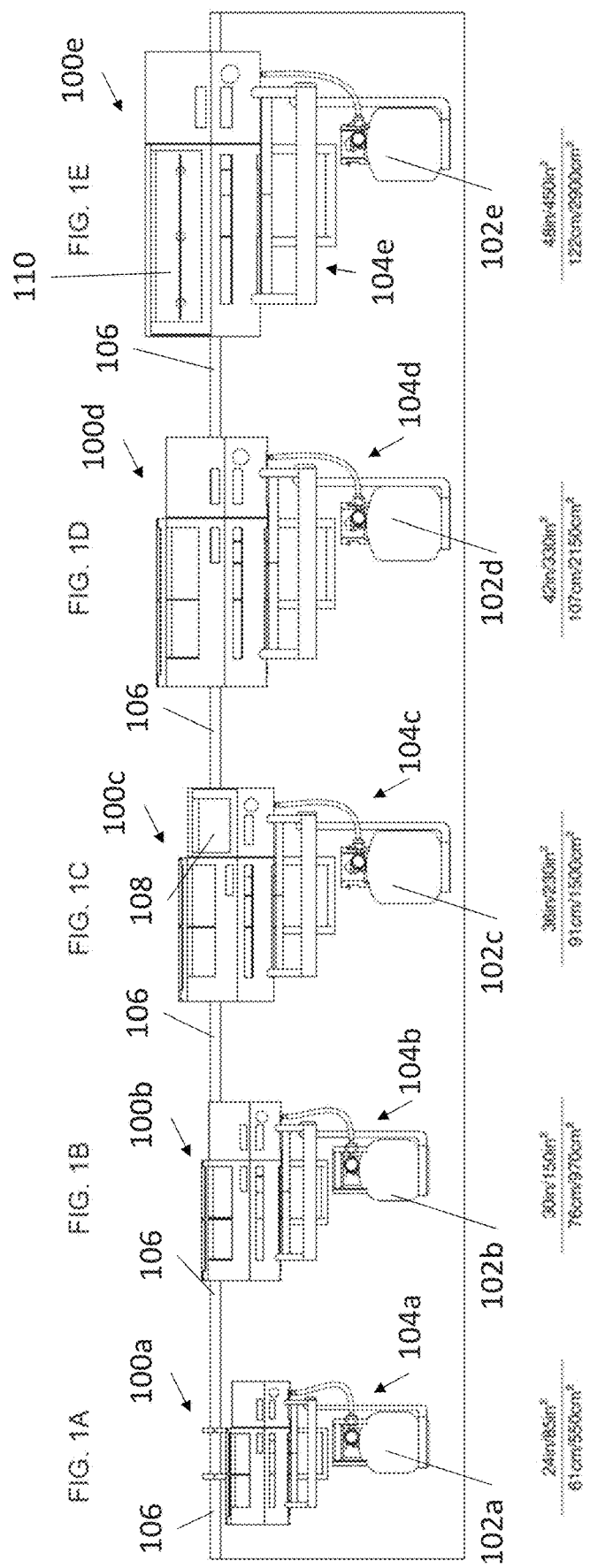

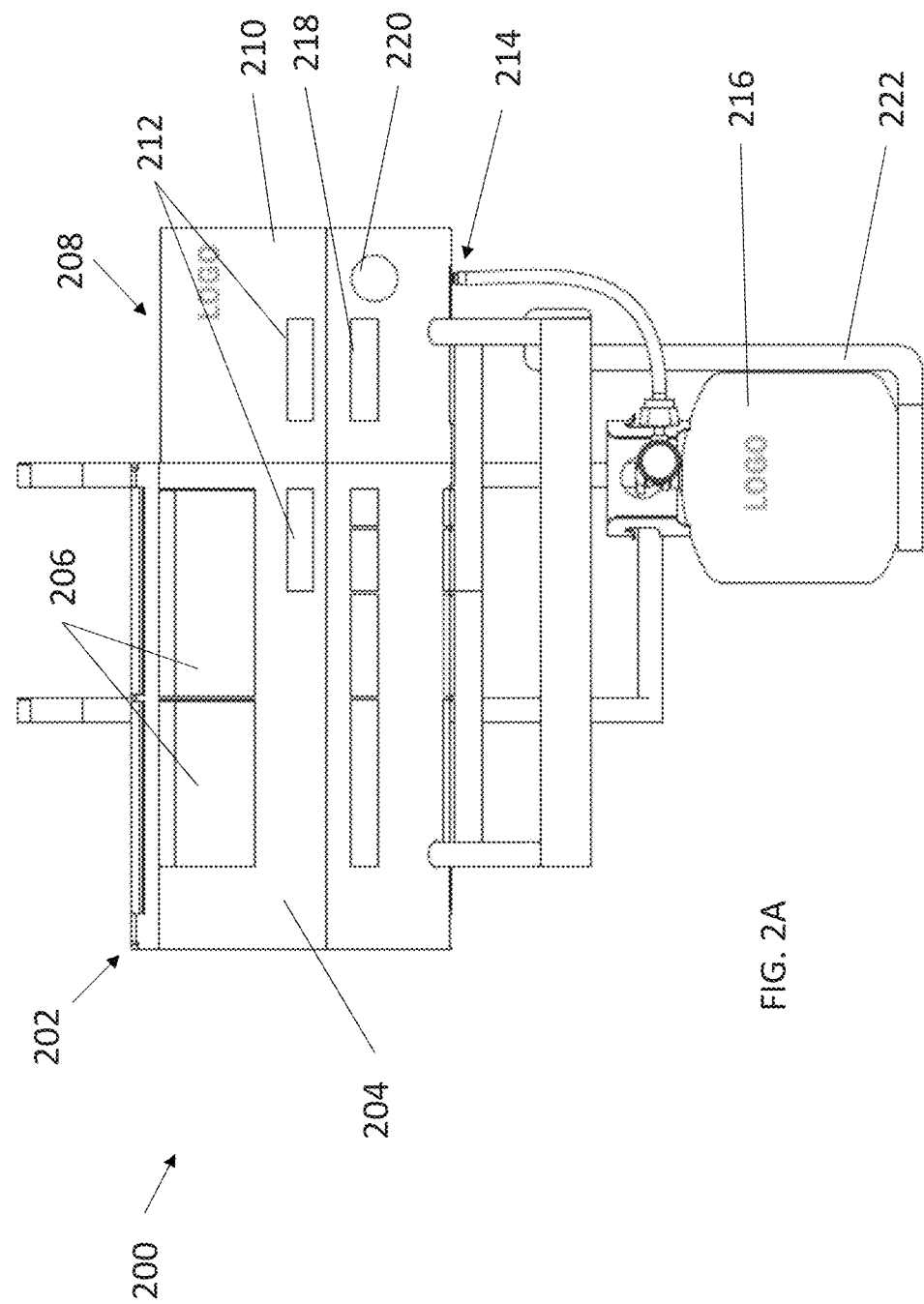

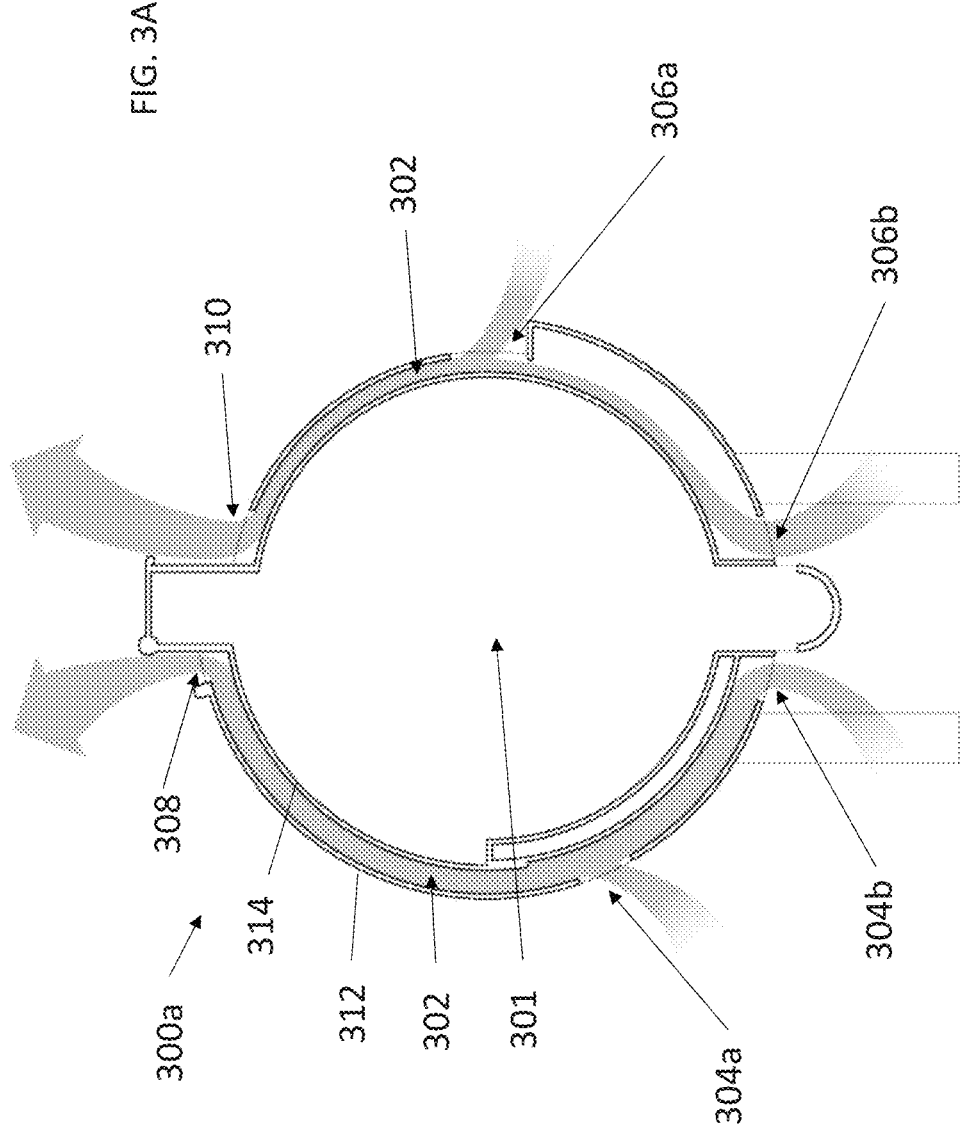

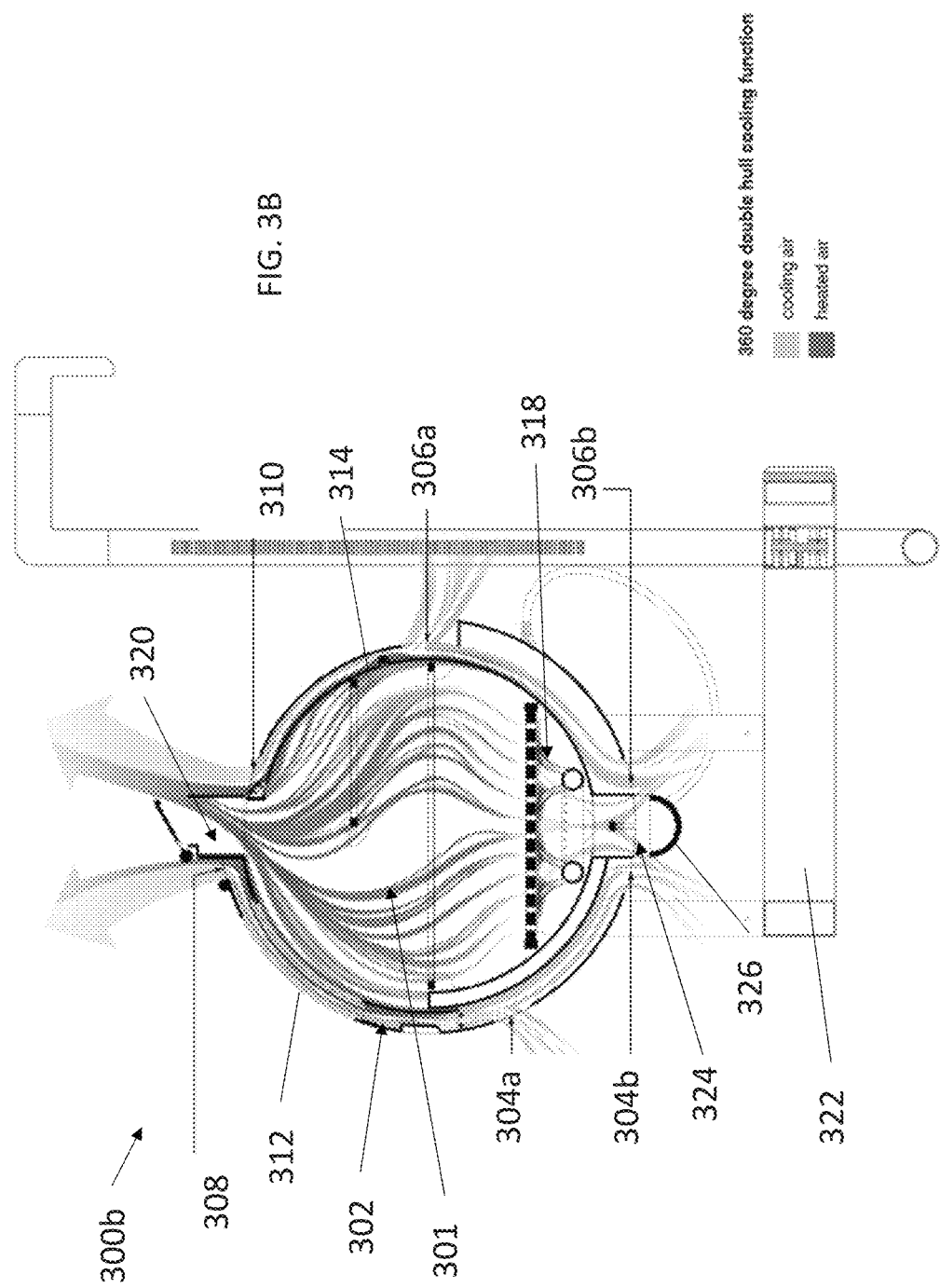

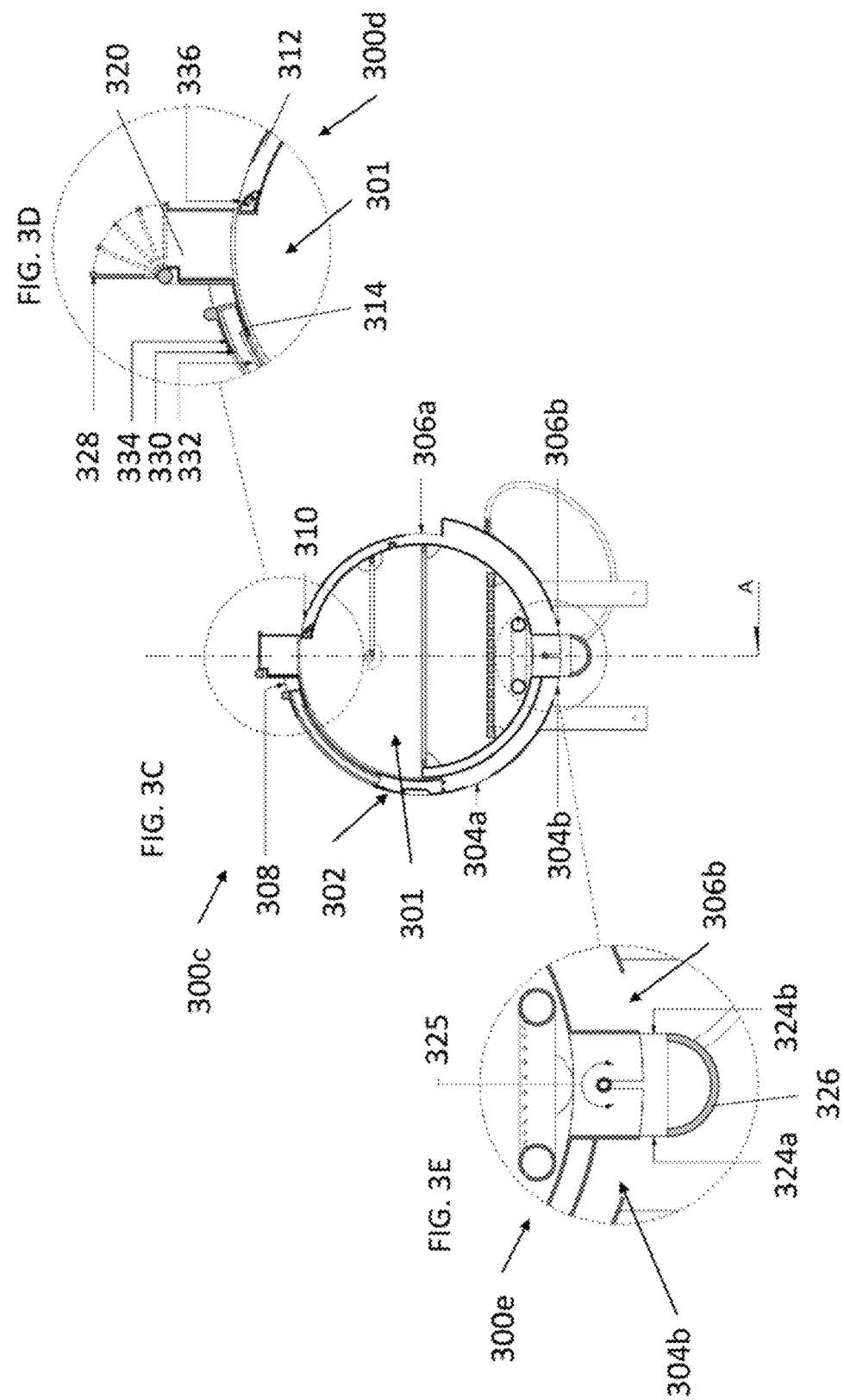

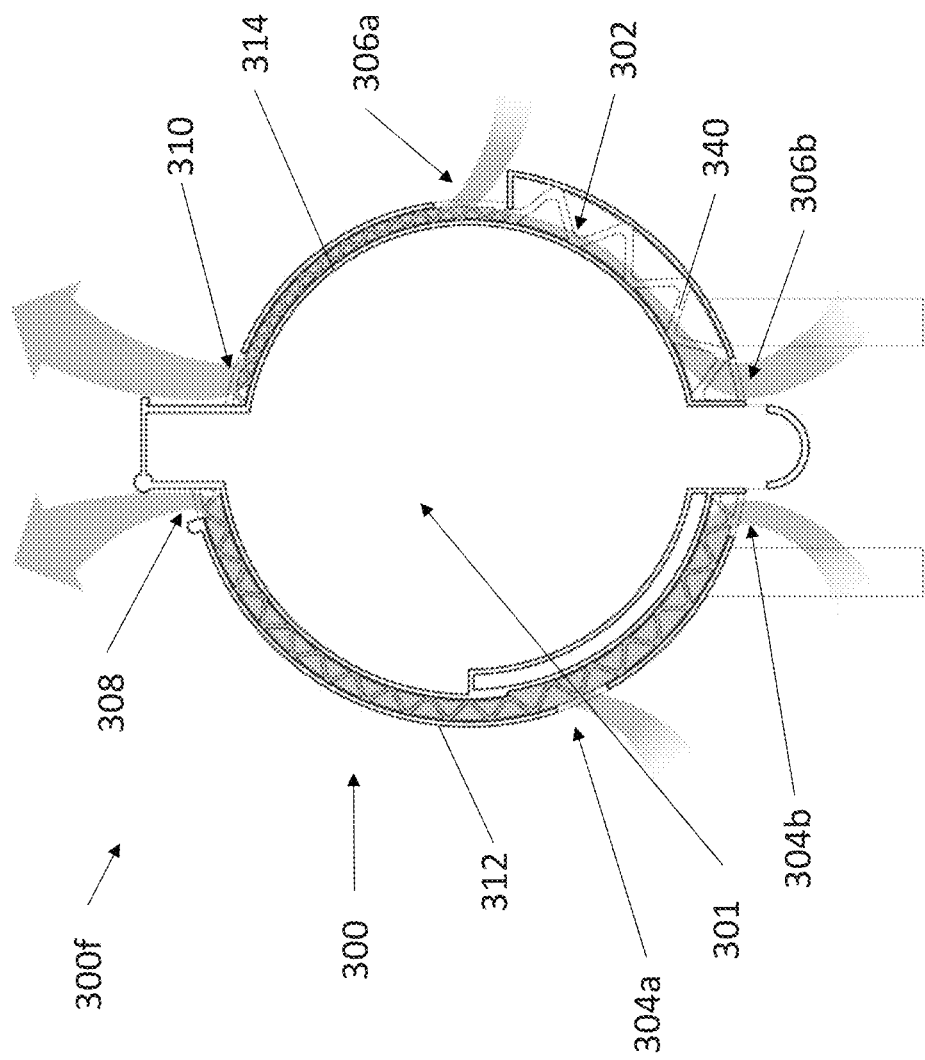

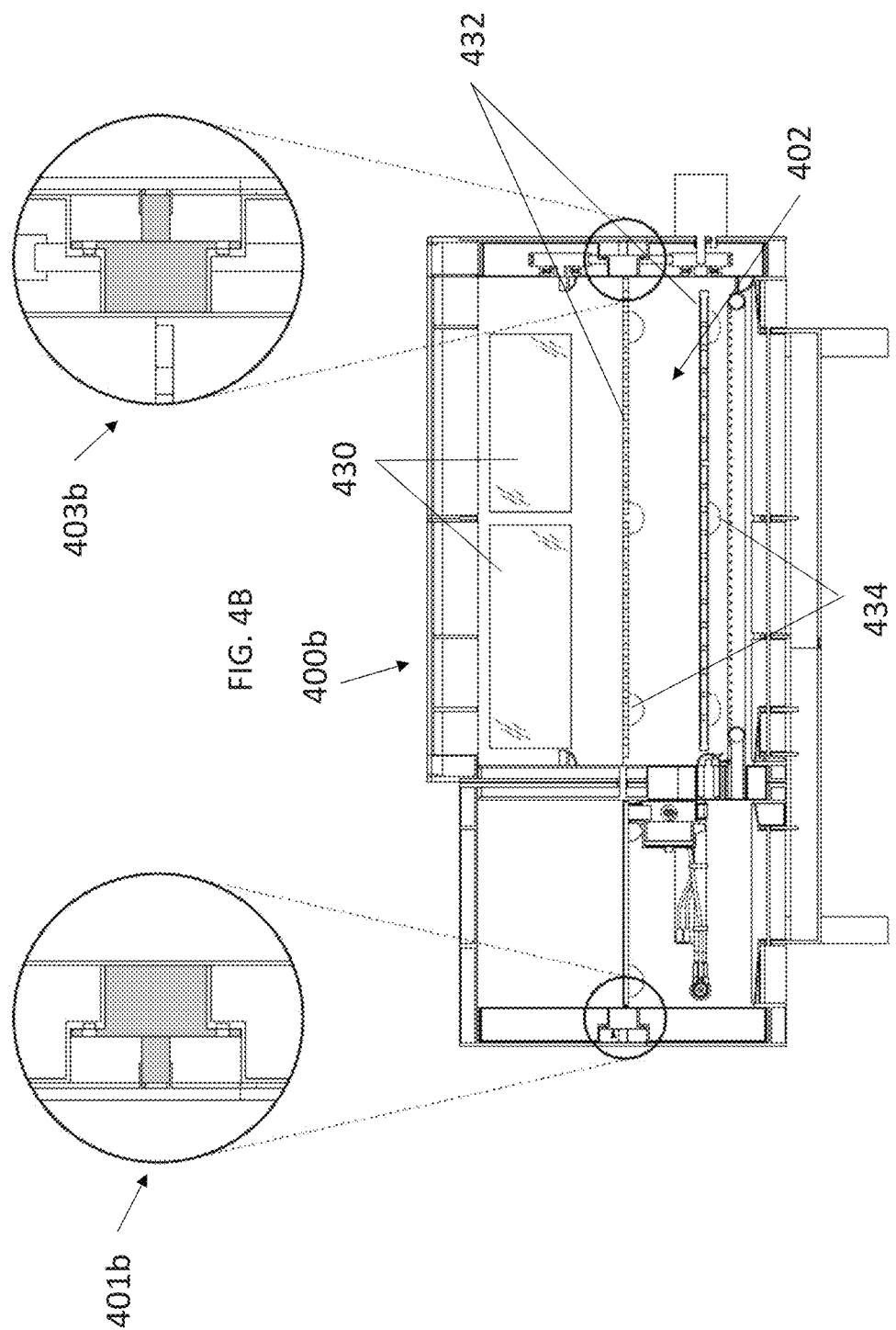

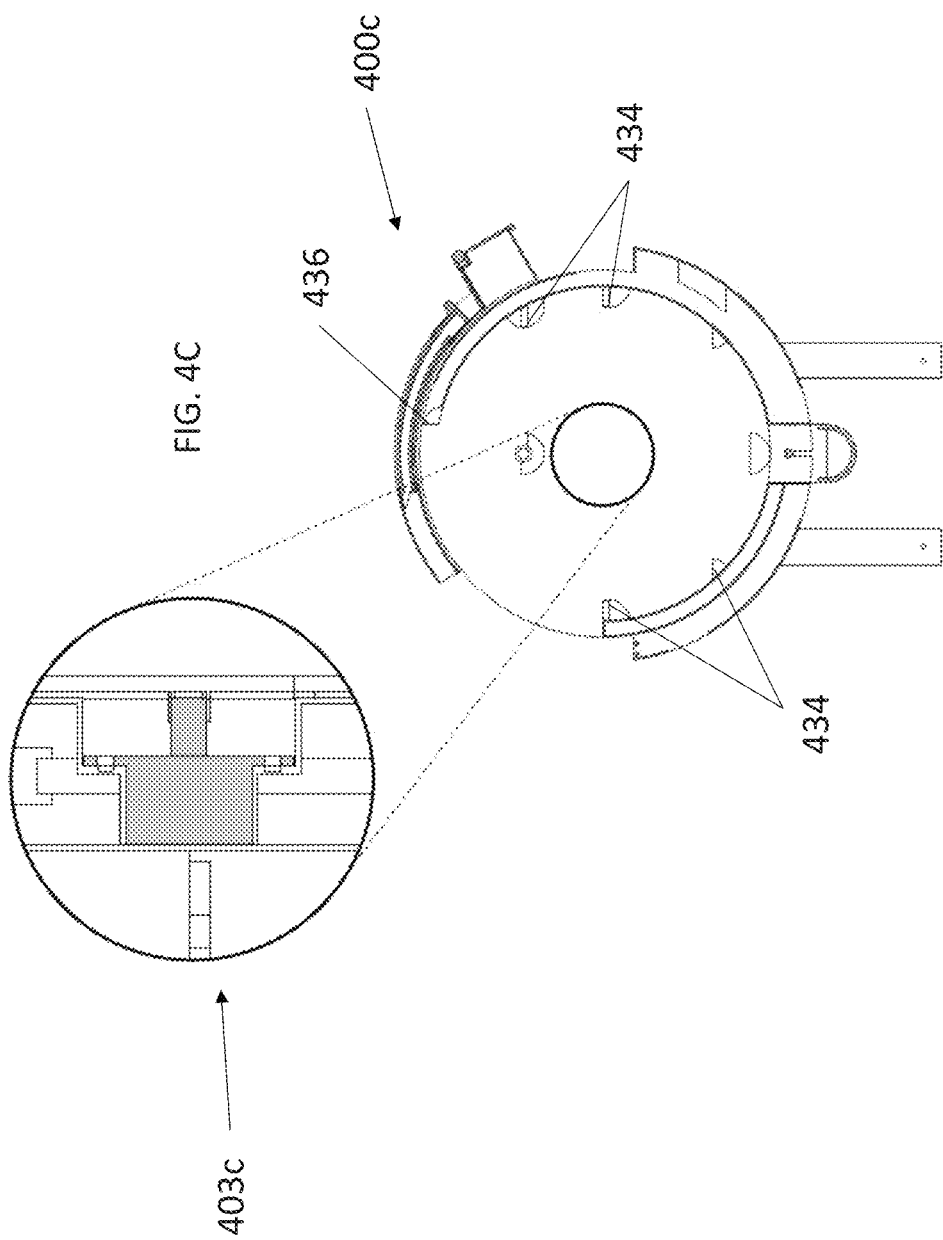

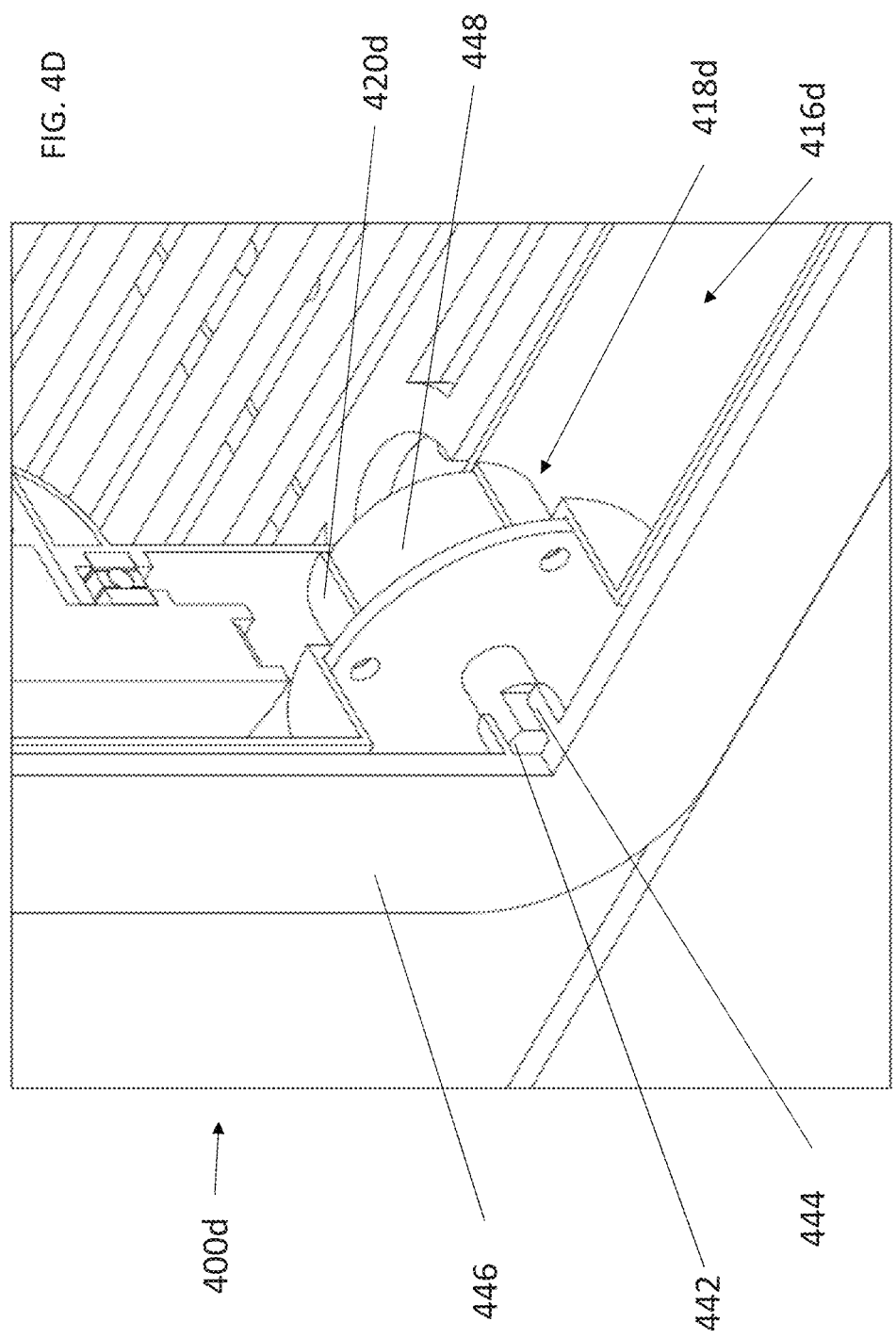

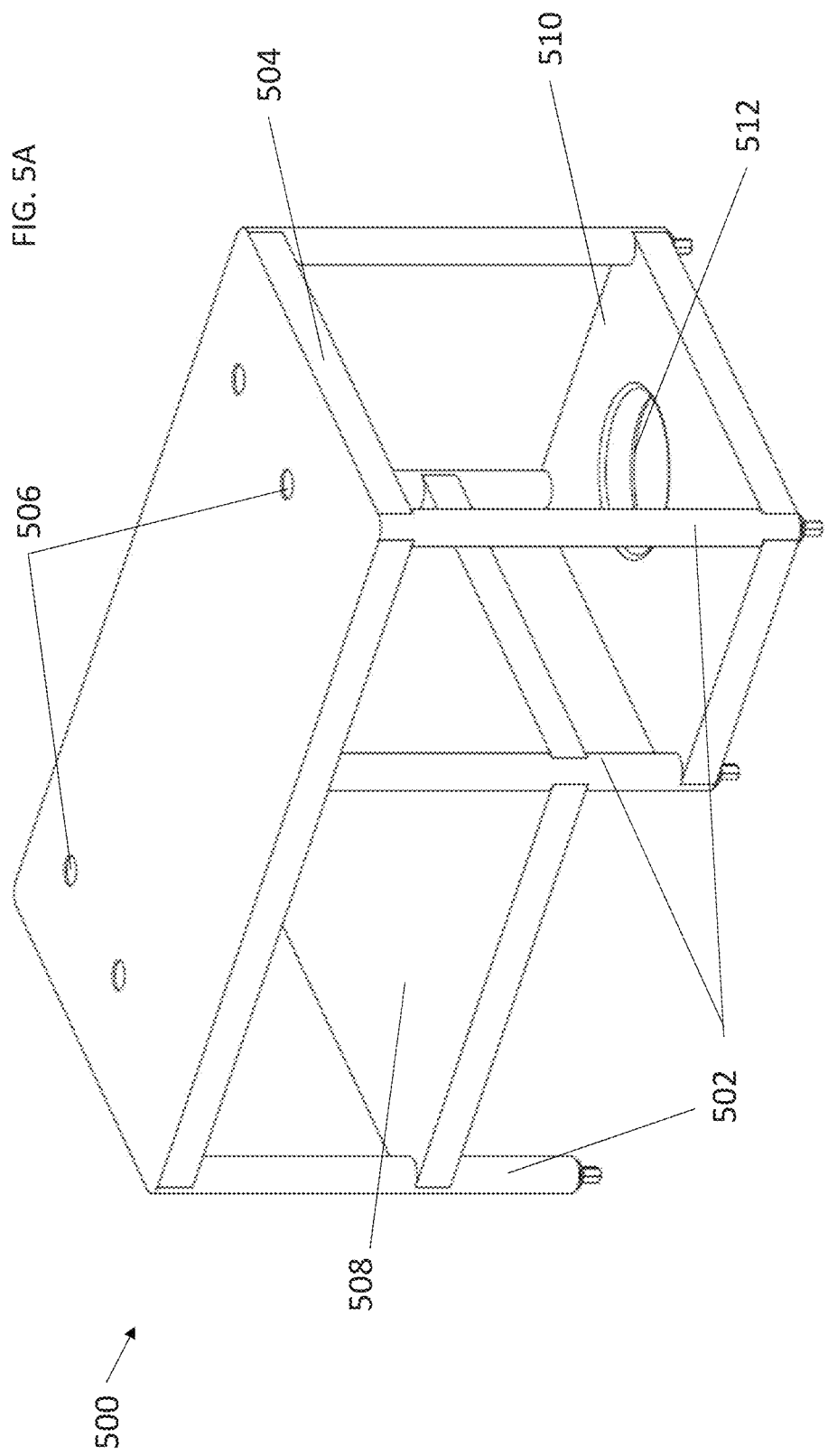

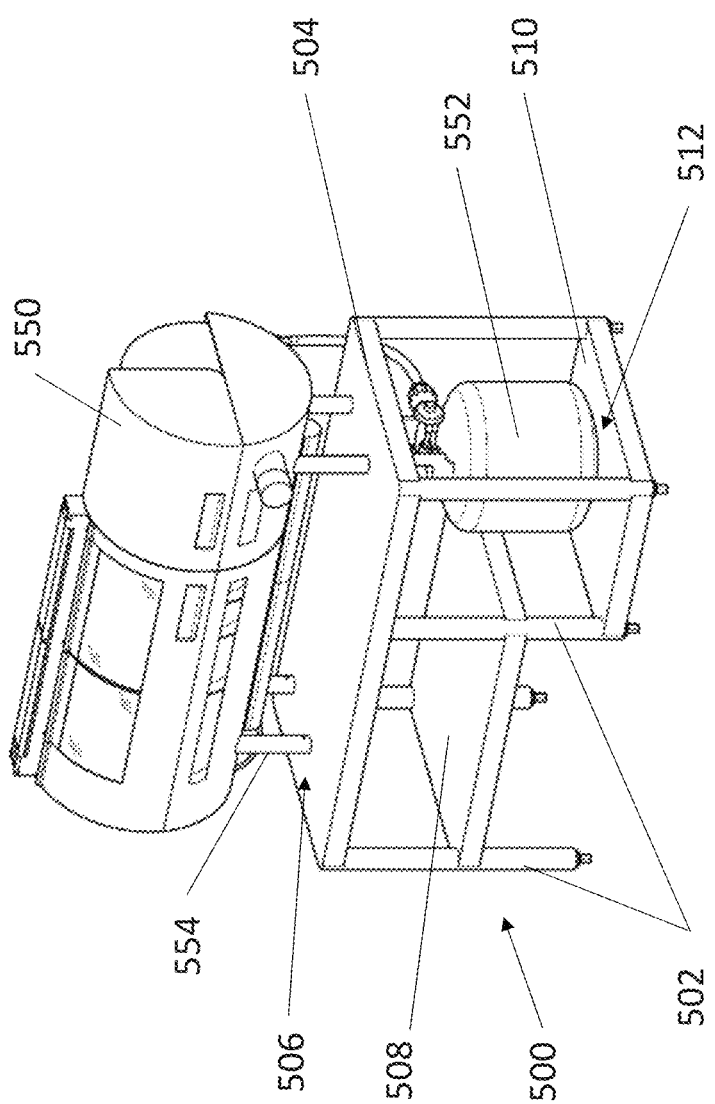

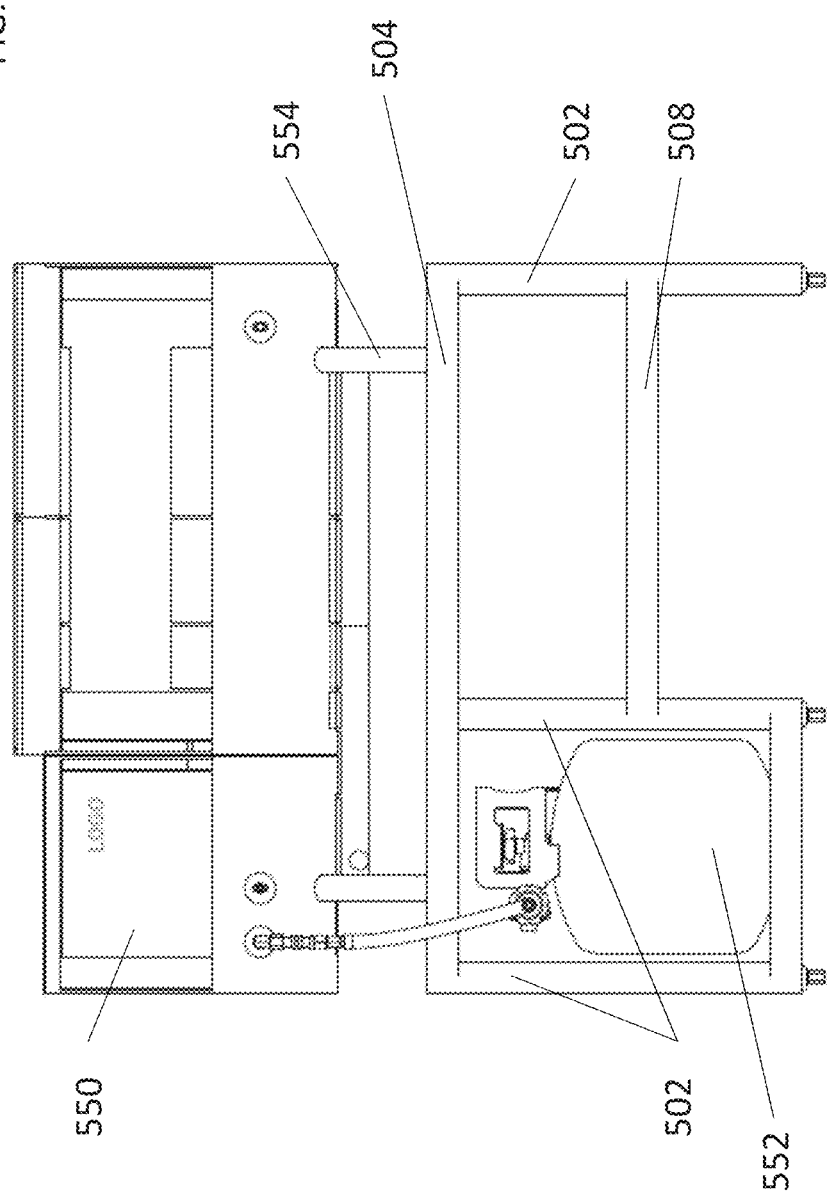

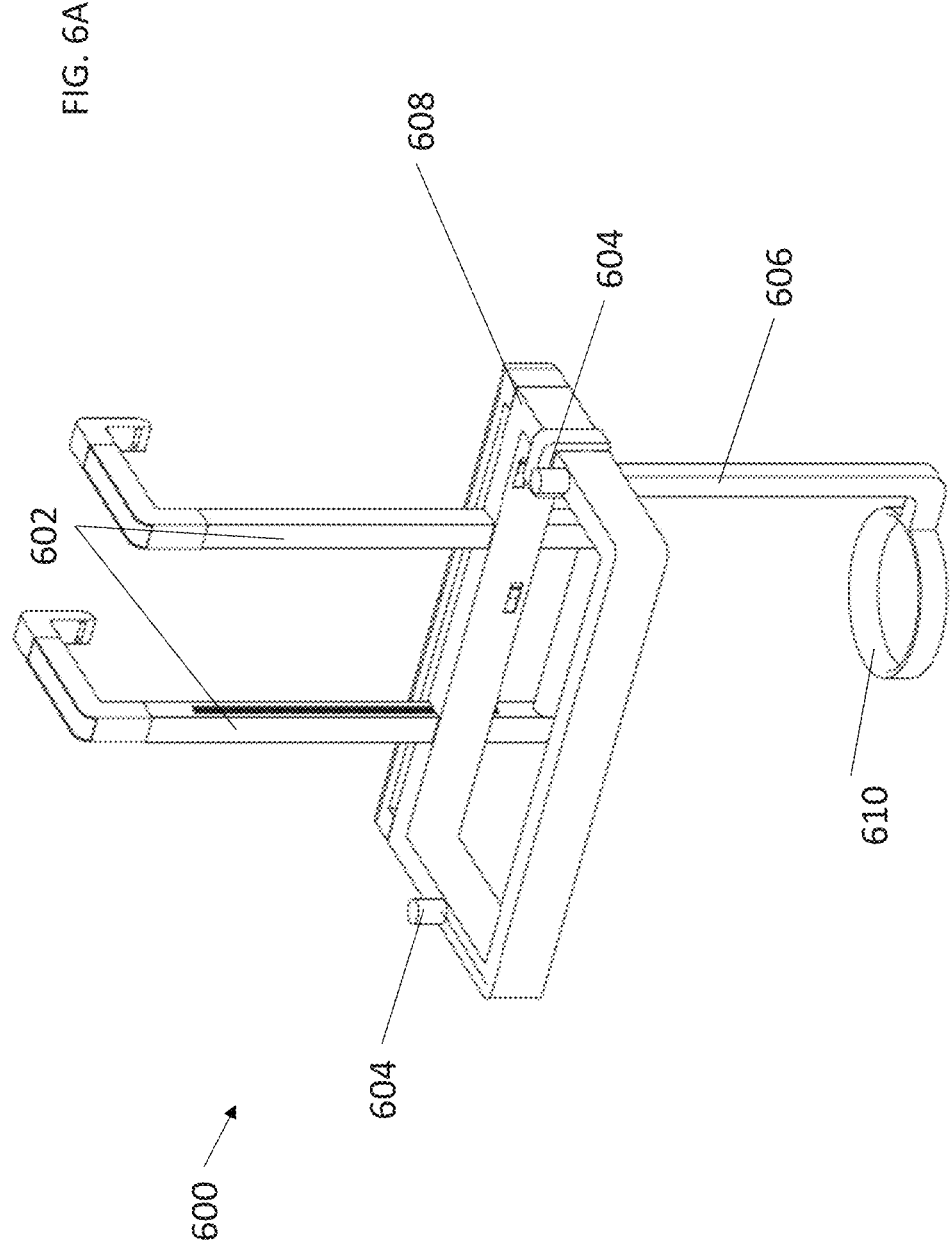

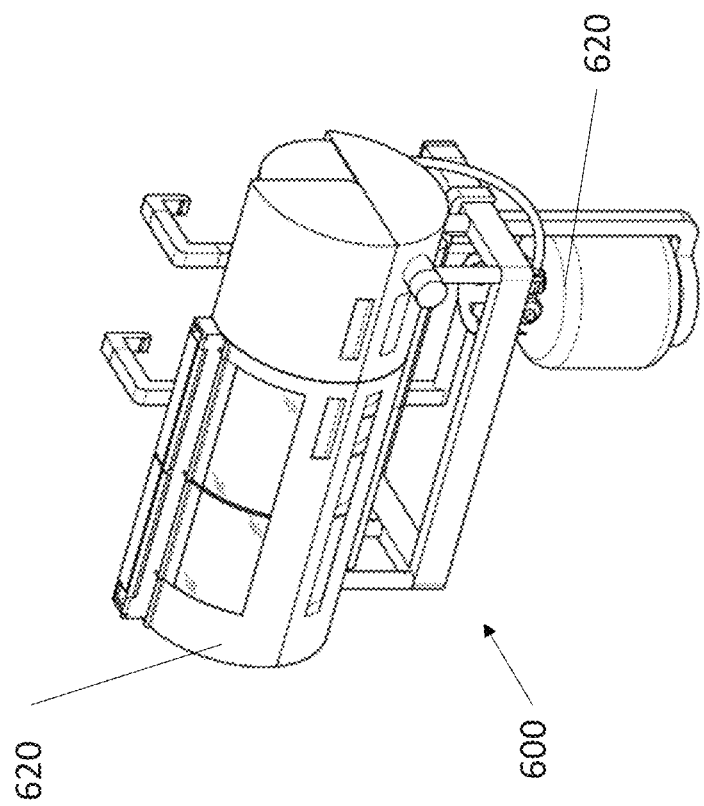

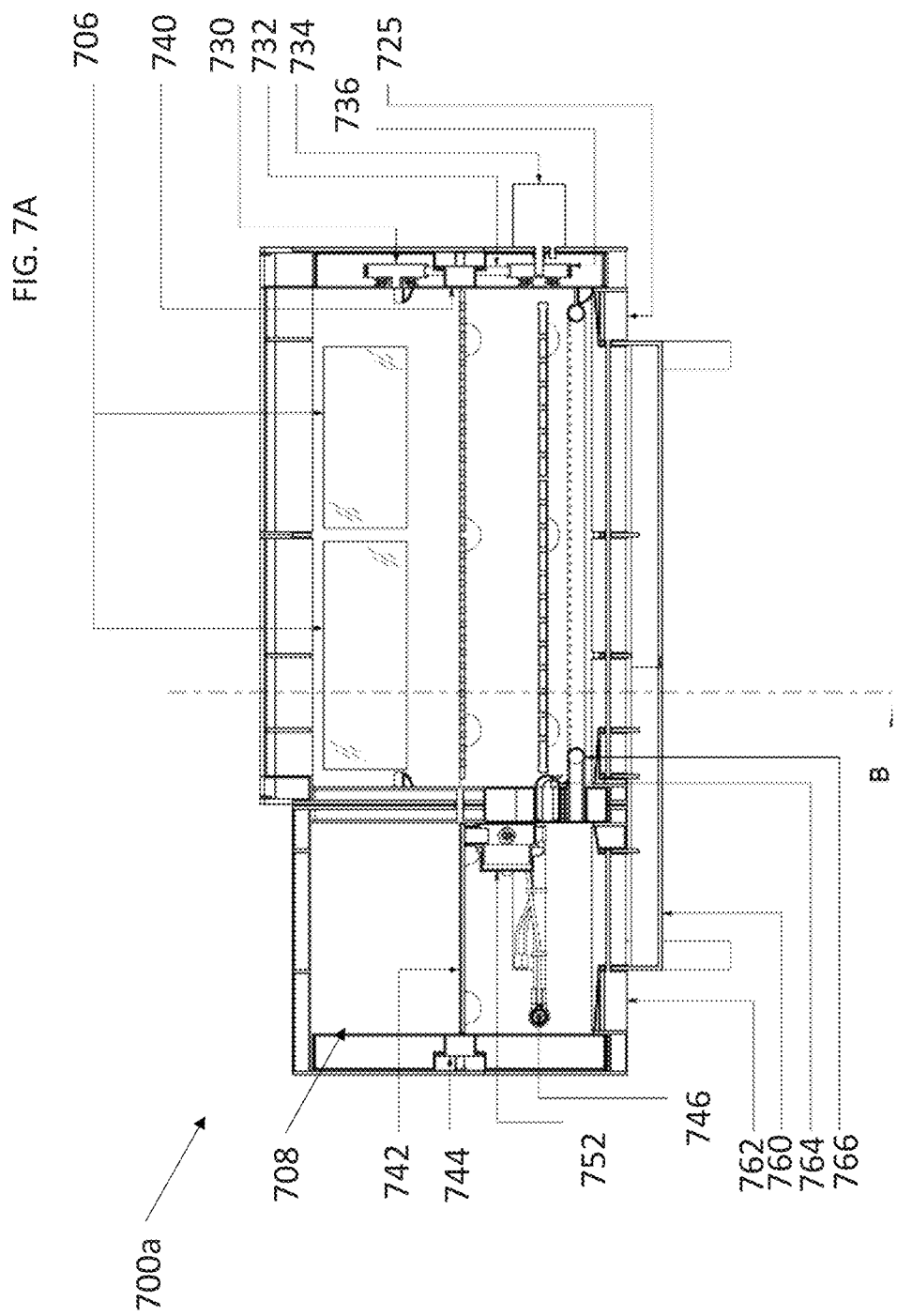

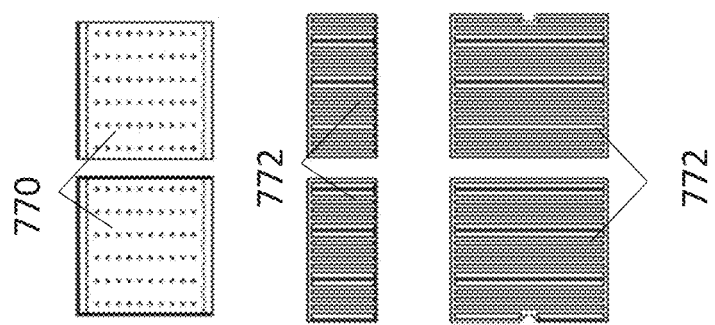
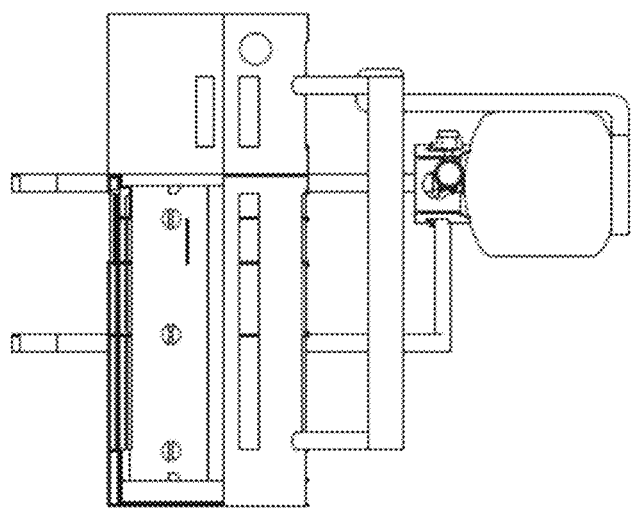
FIG. 7B
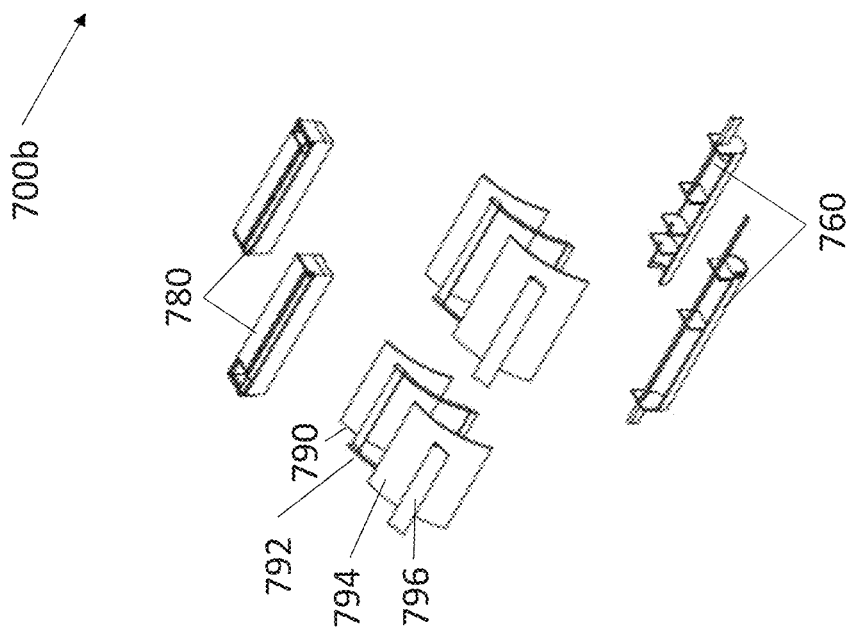

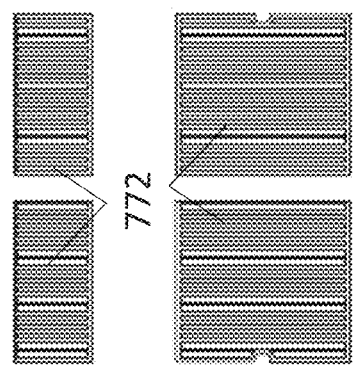
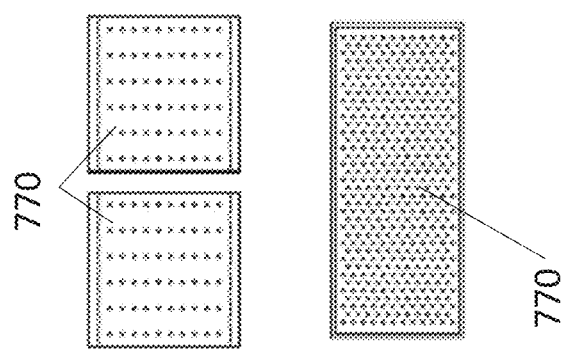
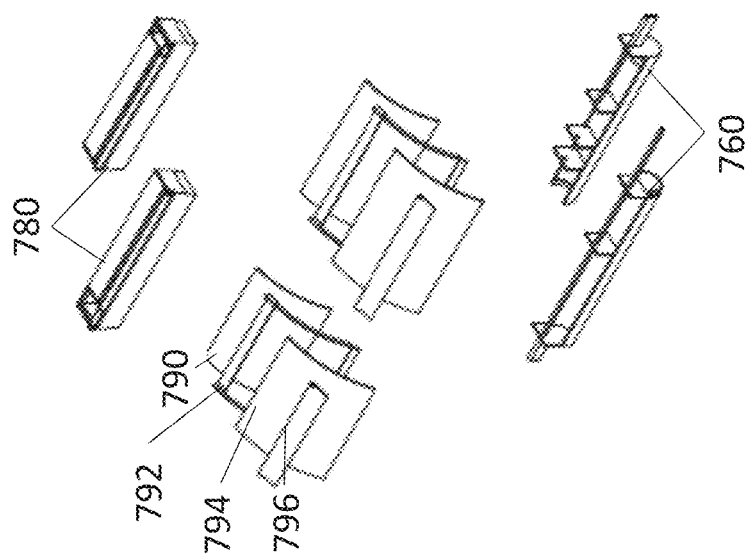
FIG. 7C

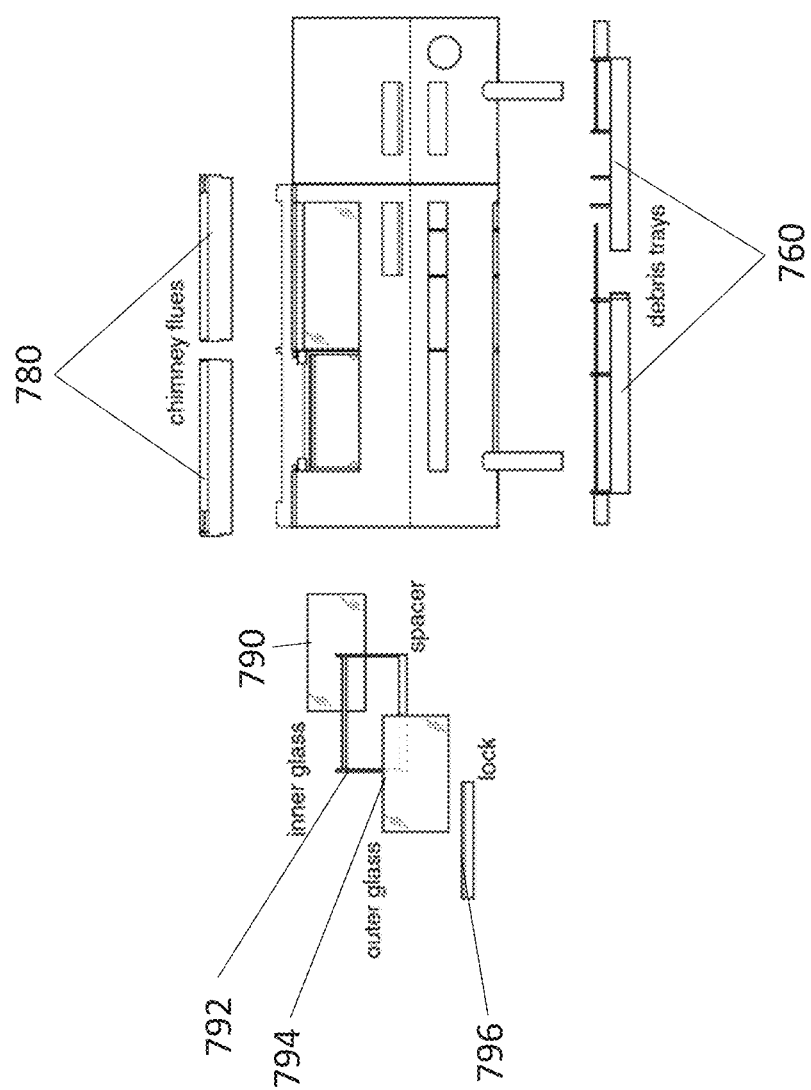

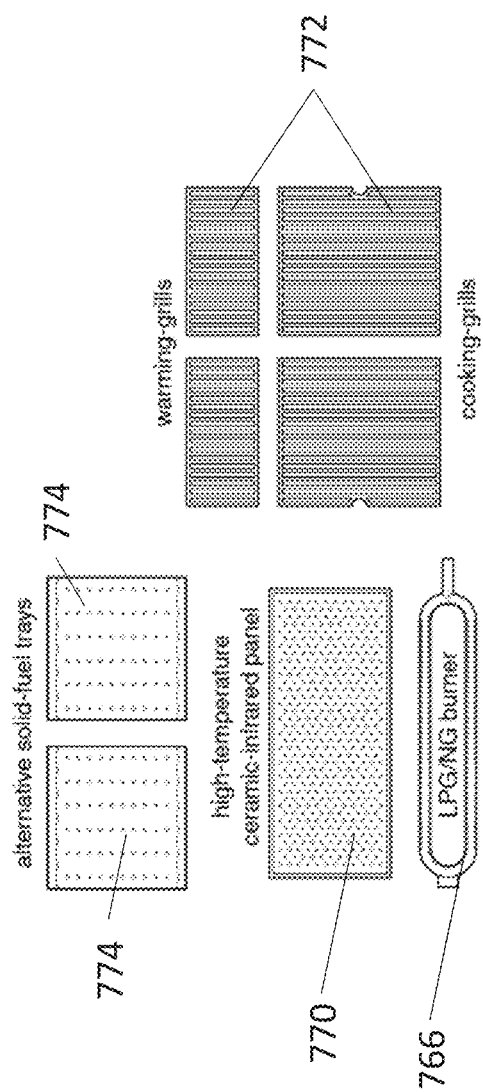

Component Dimensions

| | 24" | | 30" | | 36" | | 42" | | 46" | |
|---|---|---|---|---|---|---|---|---|---|---|
| | w | l | w | l | w | l | w | l | w | l |
| left chimney flue | 1.52 | 8.34 | 1.88 | 9.75 | 2.23 | 11.71 | 2.58 | 13.67 | 2.93 | 15.61 |
| right chimney flue | 1.52 | 7.79 | 1.88 | 10.42 | 2.23 | 12.51 | 2.58 | 14.59 | 2.93 | 16.69 |
| left-outer view-glass | 4.26 | 5.4 | 5.38 | 6.81 | 6.5 | 8.23 | 7.62 | 9.64 | 8.73 | 11.06 |
| right-outer view-glass | 4.26 | 6.73 | 5.38 | 8.49 | 6.5 | 10.24 | 7.62 | 12 | 8.73 | 13.73 |
| left-inner view-glass | 3.59 | 5.4 | 4.52 | 6.81 | 5.44 | 8.23 | 6.37 | 9.64 | 7.29 | 11.06 |
| right-inner view-glass | 3.59 | 6.73 | 4.52 | 8.49 | 5.44 | 10.24 | 6.37 | 12 | 7.29 | 13.73 |
| left debris tray | 1.34 | 9.67 | 1.67 | 11.96 | 2.01 | 14.25 | 2.34 | 16.54 | 2.67 | 18.83 |
| right debris tray | 1.34 | 8.98 | 1.67 | 11.27 | 2.01 | 13.57 | 2.34 | 15.86 | 2.67 | 18.13 |
| solid-fuel trays | 4.9 | 6.3 | 6.61 | 8.12 | 8.31 | 9.96 | 10 | 11.78 | 11.67 | 13.63 |
| warming-grills | 2.52 | 6.74 | 3.66 | 8.56 | 4.78 | 10.4 | 5.91 | 12.22 | 7.03 | 14.07 |
| cooking-grills | 6.02 | 6.74 | 8.45 | 8.56 | 10.87 | 10.4 | 13.29 | 12.22 | 15.71 | 14.07 |

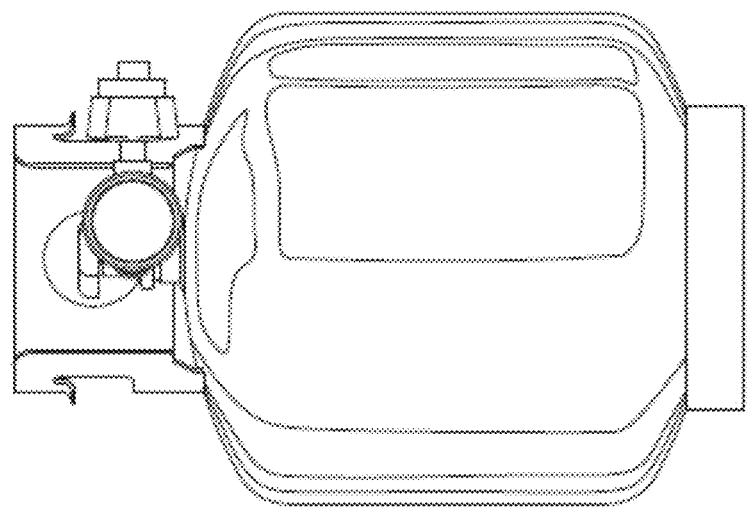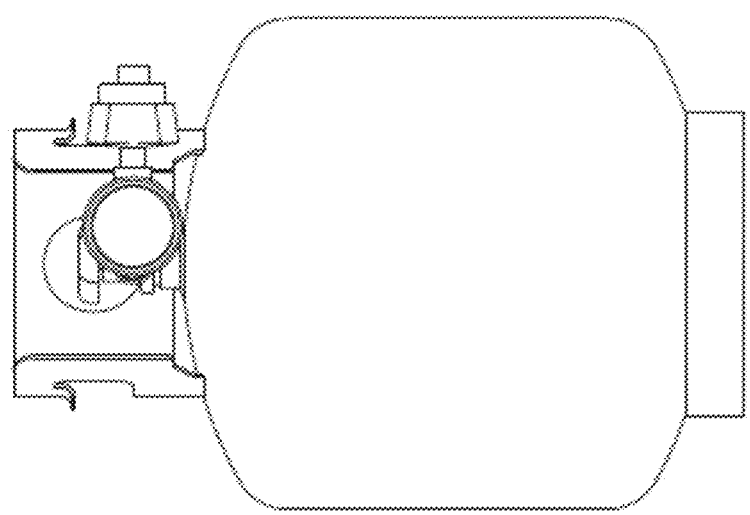
FIG. 12

MODULAR GRILL AND SMOKER, SUPPORT STRUCTURES AND USER DEVICE INTEGRATION

CROSS-REFERENCE TO RELATED APPLICATIONS

The present application claims priority to U.S. Provisional Application No. 62/237,134 filed Oct. 5, 2015, titled "Modular Grill and Smoker, Support Structures and User Device Integration," which is hereby incorporated by reference in its entirety.

FIELD

The subject matter described herein relates generally to modular grill and smoker apparatuses, support structures and user device integration and associated systems, methods, and devices.

BACKGROUND

Grilling and smoking are popular methods of food preparation that have existed for much of human history. The refinement of materials in modern times has allowed for advancement of grilling and smoking technology from fireplaces and open flames to include individual units that can grill and smoke food and may be permanently installed in one location or can be transported for use in various locations and can include enclosed chambers. As such, a wide variety of modern grills and smokers exist, from low-end, cheap versions to top of the line installations costing thousands or tens of thousands of dollars.

Modern grills and smokers, especially high-end versions, are typically constructed of materials that are welded and assembled by human hand and require significant investment of human time, energy and capital to construct. Additionally, these devices often require numerous joining means such as screws, nails, washers, seals and others that can be lost, broken or otherwise malfunction. Modern grills and smokers are also typically difficult to clean and must be washed by hand, again requiring significant time and energy. Additionally, modern grills generally do not have integration with wireless devices, networks or systems such that they provide for interaction, remote monitoring or integration with electronic data.

Thus, needs exist for improved techniques and methods by which to manufacture, grills and smokers. Additionally, improved cleanability, easier manufacturer, intermediary and end user assembly and transportation are valuable. Also, integration with modern electronic devices is desirable.

SUMMARY

Provided herein are embodiments of systems, devices and methods for manufacturing, building and using modular grill and smoker apparatuses, support structures and, in some embodiments, user device integration.

The configuration of the devices described herein in detail are only example embodiments and should not be considered limiting. Other systems, devices, methods, features and advantages of the subject matter described herein will be or will become apparent to one with skill in the art upon examination of the following figures and detailed description. It is intended that all such additional systems, devices, methods, features and advantages be included within this description, be within the scope of the subject matter described herein, and be protected by the accompanying claims. In no way should the features of the example embodiments be construed as limiting the appended claims, absent express recitation of those features in the claims.

BRIEF DESCRIPTION OF THE FIGURES

The details of the subject matter set forth herein, both as to its structure and operation, may be apparent by study of the accompanying figures, in which like reference numerals refer to like parts. The components in the figures are not necessarily to scale, emphasis instead being placed upon illustrating the principles of the subject matter. Moreover, all illustrations are intended to convey concepts, where relative sizes, shapes and other detailed attributes may be illustrated schematically rather than literally or precisely.

FIGS. 1A-1E are front views of example embodiments of a modular grill and smoker with a balcony mounted support rack, particularly mounted on a rail with analogous features of different scaled dimensions.

FIG. 2A is a front view depicting an example embodiment of a modular grill and smoker.

FIG. 3A is a side cross-sectional diagram depicting an example embodiment of a modular grill and smoker airflow corridor.

FIG. 3B is a side cross-sectional diagram depicting an example embodiment of a modular grill and smoker cooking chamber and airflow corridor mounted on a support rack.

FIG. 3C is a side cross-sectional diagram depicting an example embodiment of a modular grill and smoker cooking chamber and airflow corridor.

FIG. 3D is a side cross-sectional diagram depicting an example embodiment of a modular grill and smoker upper component area cross section.

FIG. 3E is a side cross-sectional diagram depicting an example embodiment of a modular grill and smoker lower component area cross section.

FIG. 3F is a side cross-sectional diagram depicting an example embodiment of a modular grill and smoker airflow corridor with internal structures shown.

FIG. 4B is a front cross-sectional diagram depicting an example embodiment of a modular grill and smoker with a close-up of rotary dampened door features.

FIG. 4C is a side view depicting an example embodiment of a modular grill and smoker with a close-up of rotary dampened door features and locational indices.

FIG. 4D is a cutaway perspective view depicting an example embodiment of a modular grill and smoker with a rotary dampened door feature.

FIG. 5A is a front perspective view depicting an example embodiment multi-surface table, operable to be paired with of a complementary modular grill and smoker.

FIG. 5B is a front perspective view depicting an example embodiment of a paired modular grill and smoker multi-surface table with a modular grill and smoker and external fuel source.

FIG. 5C is a back view depicting an example embodiment of a paired modular grill and smoker multi-surface table with a modular grill and smoker and external fuel source FIG. 6A is a front perspective view depicting an example embodiment of a modular grill and smoker support rack.

FIG. 6C is a front perspective view depicting an example embodiment of a modular grill and smoker support rack with a mounted external fuel source and modular grill and smoker.

FIG. 7A is a front cutaway view depicting an example embodiment of an assembled modular grill and smoker with individual component details.

FIG. 7B is a front view depicting an example embodiment of a modular grill and smoker with a rack with individual component details.

FIG. 7C is a view depicting an example embodiment of modular grill and smoker individual component details.

FIG. 7D is a view depicting an example embodiment of modular grill and smoker external component details.

FIG. 7E is a view depicting an example embodiment of modular grill and smoker internal component details.

FIG. 8 is a chart depicting an example embodiment of modular grill and smoker component dimensions for different sized modular grills and smokers.

FIG. 12 is a view depicting an example embodiment of modular grill and smoker fuel tanks.

DETAILED DESCRIPTION

Figure 2B:
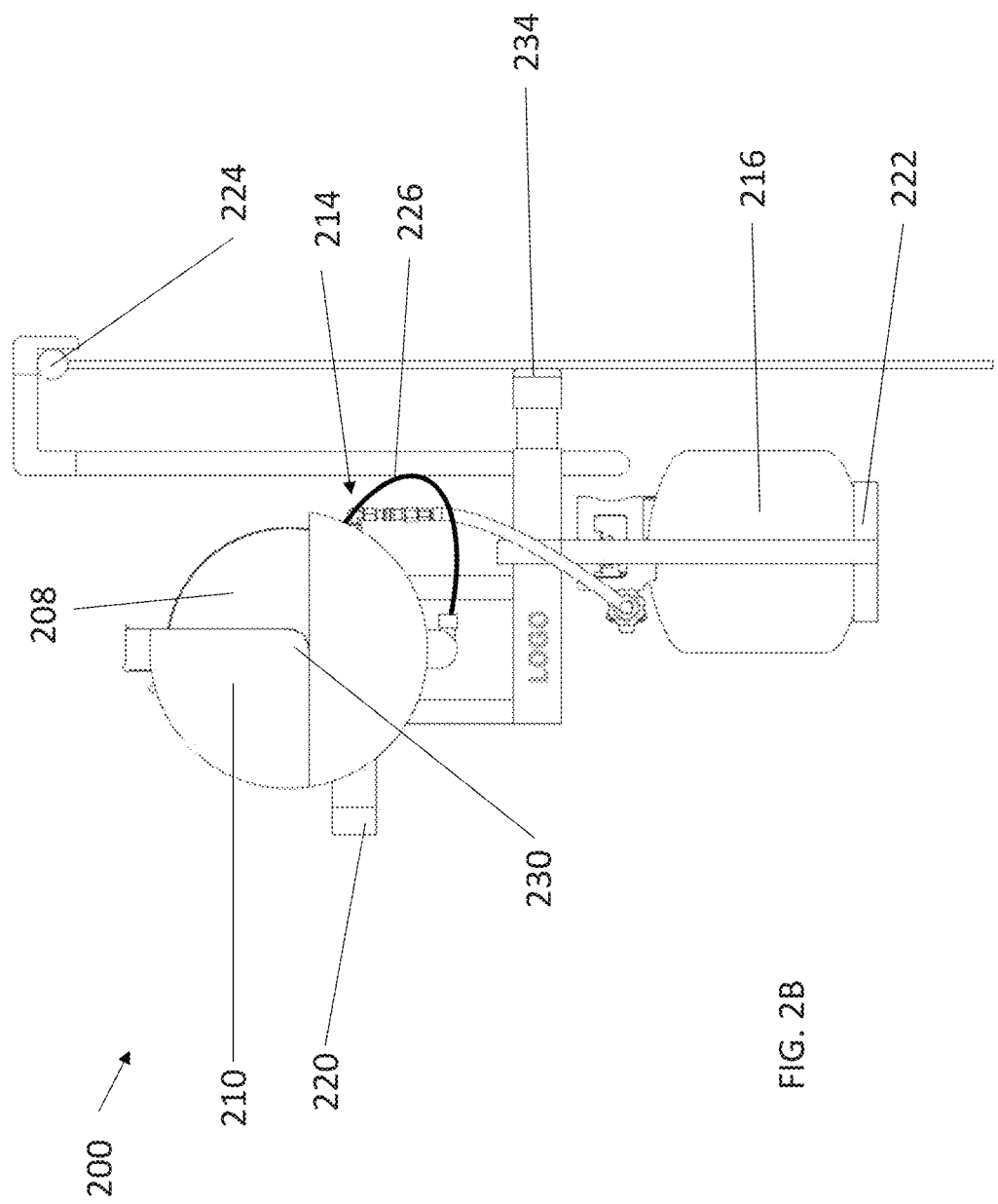
FIG. 2B is a side view depicting an example embodiment of a modular grill and smoker with a balcony mounted support rack, particularly mounted on a rail.

Before the present subject matter is described in detail, it is to be understood that this disclosure is not limited to the particular embodiments described, as such may, of course, vary. It is also to be understood that the terminology used herein is for the purpose of describing particular embodiments only, and is not intended to be limiting, since the scope of the present disclosure will be limited only by the appended claims.

Provided herein are systems, devices, and methods for creating and using modular grills and smokers used to cook food, as well as associated manufacturing and user interfaces for interacting with the same.

In various embodiments described herein and otherwise contemplated, modular grills and smokers can be parametrically designed and modified using computers, for instance through the use of programs such as Solidworks. Parametric design of modular grills and smokers can allow for quick and easy scaling changes of individual components and relative dimensions for all components to be saved in non-transitory computer readable memory. This can allow for customized production and production of unique sizes and provides great flexibility for the manufacturer. Since the relative dimensions of each part and section can be set as parameters, they can be easily exported from a design computer for use in robotic fabrication. Robotic fabrication can improve equipment setup and fabrication time and can provide savings of fifty to eighty percent, when compared to fabrication costs common to traditional manual grill and smoker fabrication processes.

In many embodiments, design and modification of grills and smokers is accomplished by executing computer operations using processors, that are stored in the form of instructions in non-transitory computer readable memory. These allow for manipulation of data and variables via user interfaces and provide for viewing of data on graphical user interfaces. Computing devices including these components and operable to execute these instructions can be user interface devices and are often networked together via public and private networks that include servers and other components and devices. Various forms of many of the computer-based devices and components required to perform these operations are described in more detail herein. Once a desired or acceptable design has been finished or formalized, it can be exported to a networked fabrication computer that can then fabricate components according to the designs via computer connected and controlled fabrication equipment to precisely calculated dimensions.

Robotic fabrication facilities can provide improved accuracy of metal shaping and welding techniques. Examples of known techniques include: arc welding, oxy-fuel gas welding, resistance welding, solid-state welding and others. Examples of arc welding include: atomic hydrogen welding (AHW), bare metal arc welding (BMAW), carbon arc welding (CAW), flux cored arc welding (FCAW, FCAW-S), gas metal arc welding (GMAW), gas tungsten (GTAW), plasma arc welding (PAW), shielded metal arc welding (SMAW), submerged arc welding (SAW), magnetically impelled arc butt welding (MIAB) and others. Examples of oxy-fuel gas welding include: air-acetylene welding (AAW), oxyacetylene welding (OAW), oxygen/propane welding, oxyhydrogen welding (OHW), pressure gas welding (PGW) and others. Examples of resistance welding include: resistance spot welding (RSW), resistance seam welding (RSEW), projection welding (PW), flash welding (FW), upset welding (UW) and others. Examples of solid-state welding include: co-extrusion welding (CEW), cold pressure welding (CW), diffusion welding (DFW), explosion welding (EXW), electromagnetic pulse welding, forge welding (FOW), friction welding (FRW), friction stir welding (FSW), hot pressure welding (HPW), hot isostatic pressure welding (HPW), roll welding (ROW), ultrasonic welding (USW), and others. Some examples of other types of welding include: electron beam welding (EBW), electro-slag welding (ESW), flow welding, induction welding (IW), laser beam welding (LBW), laser-hybrid welding, percussion welding (PEW), thermite welding (TW), electro-gas welding, stud arc welding, Tungsten Inert Gas (TIG) and others.

Utilizing these forms of equipment can be beneficial since the grills and smokers described herein are of a modular design they do not need a full scale production facility. Therefore, individual assemblies and sub-assemblies can be sourced from one or more offshore or domestic robotic fabricators, shipped in parts or pieces to reduce costs and an end product can be assembled elsewhere by distributors, retailers and end-users. An additional benefit is that during production, welds can be created more quickly and more accurately than could be accomplished by a human. This improves finished product quality and durability and increases the efficiency in creating such products.

The modular designs described herein provides for simple assembly and disassembly without the need for specialized tools or even traditional tools such as hammers, wrenches, screwdrivers, nails, screws, washers, or others. Hitch-pins and other simple yet durable connections provide quick and easy securing means for assembly and disassembly. As such, cleaning of the modular grill and smoker is vastly improved over current and former grills and smokers. Many components are particularly sized so they can be soaked in standard kitchen and commercial sinks and fit within normal dishwashing machines for added convenience.

FIGS. 1A-1E are front views of example embodiments of modular grill and smoker combination apparatuses 100a-100e, respectively, each with a support rack 104a-104e and mounted on a rail 106 and having analogous features of different scaled dimensions. In the example embodiments, different size apparatuses are shown, representing a broad range of scales and sizes for a modular grill and smoker from a modest 24 inches across the entire apparatus in 100a, to 30 inches in 100b, to 36 inches in 100c, to 42 inches in 100d and 48 inches across the entire apparatus in 100e. These respectively correspond to a cooking surface area contained within the modular grill and smoker, exclusive of a warming shelf area and can be 85 square inches in 100a, 150 square inches in 100b, 230 square inches in 100c, 330 square inches in 100d and 450 square inches in 100e. The sizes and dimensions shown in the example embodiments are by no means exhaustive and alternative configurations are also contemplated. A fuel source 102a-102e and support rack 104a-104e shown in the example embodiments is the same size and dimension in each, showing the contrasting sized dimensions of each grill and smoker 100a-100e, respectively. FIG. 1C shows an example embodiment with an open secondary chamber 108 while FIG. 1E shows an example embodiment with an open primary chamber 110.

FIG. 2A is a front view depicting an example embodiment of a modular grill and smoker 200. In various embodiments, modular grills and smokers, such as 200, can include a sealable primary chamber 202, having a generally cylindrical or semi-cylindrical interior and exterior profile with a primary chamber access door 204 that closes the sealable primary chamber 202. When closed, sealable primary chamber 202 can have a substantially airtight seal, providing a compartment in which food can be grilled, smoked, or otherwise cooked. This primary chamber 202 is also be referred to herein as a cooking chamber. One or more windows 206 can include panels that are double glazed, optically transparent, semi-transparent or combinations thereof, that can be windows that are removable and adjustable without the need for any external or additional tools or components in various embodiments and can allow a user to visually monitor the interior of cooking chamber 202 while cooking chamber door 204 is closed. Various transparent and semi-transparent materials and combinations of materials can be used to create windows 206 including glass, plastics, and others and may have one or a variety of colors across the visible light spectrum.

A secondary closable chamber 208, which can be sealable in some embodiments, can also be cylindrical or semi-cylindrical, can have similar radial or other dimensions, when compared to cooking chamber 202 and can have a similar secondary chamber access door 210 that opens and closes to seal secondary chamber 208. In some embodiments, this can be an airtight seal. Secondary chamber 208 can have an equal or shorter cylindrical length, when compared to that of cooking chamber 202. Secondary chamber 208 will also be referred to herein as a utility chamber. Handles 212 can be formed as built-in recesses, exterior flanges and can have other structures and can be permanently coupled to each of chambers 202, 208 in order to open and close chambers 202, 208. Other structures can also be used, as known in the art or later developed, including exterior horizontal, diagonal or vertical bars with or without connecting brackets.

Primary chamber 202 and secondary chamber 208 can be independently constructed or fabricated and combined or coupled later to form a single modular grill and smoker 200 in some embodiments. In other embodiments, these chambers can be constructed or fabricated from a single, large chamber. As would be understood in the art, additional or fewer chambers can be provided and dimensions can be varied in accordance with the embodiments described herein without departing from their scope.

In some embodiments secondary chamber 208 can be a utility or control chamber that can be specially designed to be used for warming food, maintaining food temperature with minimal heat loss, storing items, cooking food at different temperatures from primary chamber 202 or performing other purposes.

The chambers 202, 208 can have one or more external fuel coupling components 214 for allowing externally supplied fuel to be fed to appropriate use points or locations in various embodiments. Components 214 can be unique to each chamber 202, 208 or shared in some embodiments. A non-exhaustive list of external fuel sources 216 includes: liquid propane gas (LPG), butane, natural gas (NG), liquid or gaseous biofuels, hydrogen, kerosene and others currently in existence or later developed. In some embodiments no couplings may be provided if internal fuel is the only fuel for use, for instance in embodiments solely for use with combustible solid fuels such as charcoal, wood and others currently in existence or later developed. Many embodiments allow for the use of either or both external and internal fuel sources. Also contemplated are electrical heating sources, such as coils, that may be externally or battery powered.

As shown in the example embodiment, one or more displays can be provided on a user-facing surface of the modular grill and smoker 200. Here, this includes a primary display 218 that can be a Liquid Crystal Display (LCD), Light Emitting Diode (LED) display, touchscreen display, or others as appropriate and can include electrical coupling to power sources, temperature sensors, timers, lighting, audio speakers, additional displays, user interfaces, processors, non-transitory memory, and others as understood in the art. In some embodiments these displays can be communicatively coupled to one or more external devices, such as smartphones, tablets, wearable smart devices, video game consoles, computers or other devices. These couplings can be wired or wireless and can be accomplished using various communication protocols or standards, such as Wi-Fi, Bluetooth or others.

User interface controls 220 can be provided or mounted on various surfaces of modular grill and smoker 200, including: dials, buttons, switches, knobs, touchscreens, combinations thereof and others. As understood in the art, these user interface controls 220 allow a user to interface with modular grill and smoker 200 in order to control temperatures in chambers 202, 208, timers, clocks, power, lighting, fuel, audio output, and other necessary and optional components.

Other mechanical, electrical and electro-mechanical components and features can be included on appropriate interior and exterior surfaces including support racks, holders, tables, cutting boards, pots, pans, storage compartments, and others as understood in the art without departing from the scope of the embodiments described herein.

Also shown in the example embodiment, is a support rack 222 supporting primary and secondary chambers 202, 208, as well as a fuel source 216, which in this case is a LPG tank. In various embodiments, support racks 222 can be highly adjustable by users, including pitch, height and balancing adjustments. In some embodiments, these support racks 222 can be installed on balconies, fences, walls, boat railings, and many others.

FIG. 2B is a side view depicting an example embodiment of a modular grill and smoker 200 with a support rack 222 mounted on a rail 224. In the example embodiment a user interface knob 220 is shown extending out of a front surface of the modular grill and smoker 200. A secondary chamber door 210 is shown as having a quarter circular side profile and is rotatably coupled with secondary chamber 208. As such, secondary chamber door 210 can rotate about a centrally located pivot 230 to open secondary chamber 208. In other embodiments, chamber doors can be three quadrants of a cylinder, a third of a cylinder, five-eighths of a cylinder or others as appropriate. Although not shown, ridges, tracks and other guiding components can be included in various embodiments in order to maintain door 210 in a consistent location.

An external fuel coupling component 214 is shown protruding from a rear of the modular grill and smoker 200 and extending downward at a right angle to couple with a mated coupling component from an external fuel source 216. Also shown is an exterior wire 226 for providing electrical power, in the form of a rotisserie motor power line. In some embodiments this can be provided or routed within the inside the modular grill and smoker device 200. A support rack 222 is shown as supporting the external fuel source 216 as well as the modular grill and smoker 200 that can provide permanent, semi-permanent or removable coupling for its supported components. Support rack 222 is discussed in further detail herein with respect to FIGS. 6A-6C. In some embodiments a back-piece 234 can include one or more adjustable legs or bars. These legs or bars can include rubber end pieces to protect an installation location from damage. Adjustment can be accomplished using threaded screwing mechanisms, notches, ratcheting mechanisms, or others and can be locked in place in many embodiments.

Figure 2C:
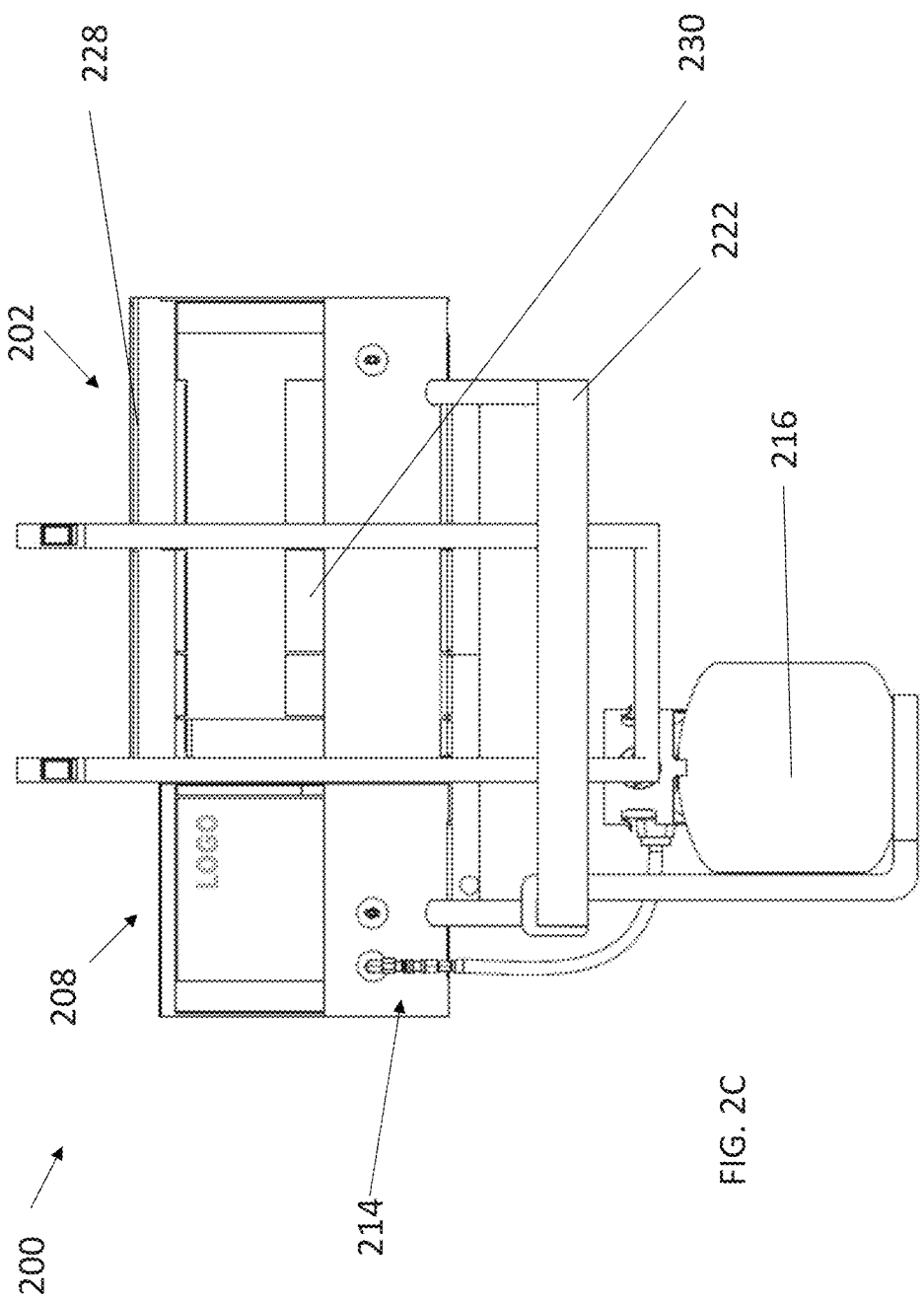
FIG. 2C is a rear view depicting an example embodiment of a modular grill and smoker with a support rack.

FIG. 2C is a rear view depicting an example embodiment of a modular grill and smoker 200 with a support rack 222. As shown in the example embodiment, an upper air exhaust flue 228 can include one or more vents, allowing air to exit the interior of modular grill and smoker 200. A rear air intake vent 230 can allow air to enter the interior of modular grill and smoker 200. Venting components and systems will further be described herein, in particular with respect to FIGS. 3A-3F.

FIG. 3A is a side cross-sectional diagram 300a depicting an example embodiment of a modular grill and smoker airflow corridor 302. In the example embodiment a cooking chamber 301, secondary chamber and other chambers (not shown) and one or more airflow corridors 302 can be fluidly independent, such that when sealed air, gases, smoke and any particulates contained therein do not flow between the independent chambers. Airflow corridor 302 allows heated air within airflow corridor 302 to escape through upper openings 308, 310 and cooler air to be drawn into airflow corridor 302 through lower openings 304a, 304b, 306a, 306b.

As shown, one or more inner surfaces of an exterior wall 312 of airflow corridor 302 can have a variety of different radii from a central axis of cooking chamber 301. In some embodiments a single, uniform exterior wall inner surface radius can exist. As shown in the example embodiment a cooking chamber 301 can likewise have a non-uniform but generally circular cross sectional shape.

In the example embodiment, airflow corridor 302 has a cross sectional shape that is generally circumferentially located about a general cooking chamber 301 circumference. As such, the radius of a common wall 314 or walls separating cooking chamber 301 from airflow corridor 302 is generally smaller than the radius of the inner surface of the exterior wall 312 or walls of airflow corridor 302. As such, airflow corridor 302 can be a circumferential chamber that provides cooling properties in some embodiments. Openings 304a, 304b, 306a, 306b, 308 and 310 can include one or more of a plurality of flues, ducts, holes, vents or other components that are provided at specific locations in the airflow corridor exterior wall 312 to promote and provide airflow through the airflow corridor 302. As a result of this configuration, air can flow within the airflow corridor 302, between the exterior wall 312 or walls of the airflow corridor 302 and the common wall 314 or walls of the cooking chamber 301. The operation and dynamics of this airflow will be discussed in further detail with respect to FIG. 3B.

FIG. 3B is a side cross-sectional diagram 300b depicting an example embodiment of a modular grill and smoker cooking chamber 301 and airflow corridor 302 mounted on a support rack 322. In various embodiments that include airflow corridors 302, the Archimedes principle can be used to great effect. As such, airflow corridor 302 provides the benefit of keeping the exterior wall 312 of the airflow corridor 302 cool to a user's touch even when the interior of cooking chamber 301 is heated to cooking or smoking temperatures. In operation, when the interior of the cooking chamber 301 is heated, for example by lighting a fuel source such as gas at heating location 318, the air inside the chamber 301 becomes warm or hot. As the air in the cooking chamber 301 becomes warm or hot, some of the heat is transferred to the common walls 314 of the cooking chamber 301. Similarly, as the common walls 314 of the cooking chamber heat up some of the heat is transferred to the air surrounding the common walls 314 and on the interior of the airflow corridor 302. As this heated air in the airflow corridor rises, it can escape out of one or more upper vents 308, 310 of the airflow corridor 302. This creates a pressure differential within the airflow corridor 302 which then draws in air from the exterior of the modular grill and smoker through one or more side vents 304a, 306a and lower vents 304b, 306b. When this air is heated by the common walls 314, it also exits the one or more upper vents 308, 310. As the air in the airflow corridor 302 does not remain in the airflow corridor 302 for much time, it does not transfer a large amount of heat to the exterior walls 312 of the modular grill and smoker, thus maintaining a tolerable temperature of the exterior walls 312 of the airflow corridor 302. As such, users are less likely to be injured if they accidentally, inadvertently or otherwise touch the exterior walls 312. In some embodiments, air flow in the airflow corridor 302 can be controlled by actuating the one or more upper vents 308, 310 as necessary.

As shown in the example embodiment, additional vents can be provided in the common walls 314 to allow airflow within the interior cooking chambers 301 including one or more upper cooking chamber vents 320 and one or more lower cooking chamber vents 324. While in some embodiments vents may be located uniformly at standard locations in the walls 312, 314 of chamber 301, they can be located in any appropriate, desired or convenient locations such that they provide the desired airflow as described herein. The example embodiment in particular shows a front cooling-air exit 308 adjacent to a front wall of vent 320, that functions as a chimney and a rear cooling-air exit 310 adjacent to a rear wall of vent 320 at an upper area of the modular grill and smoker. At a middle to lower area of the modular grill and smoker are provided dual front cooling-air intakes 304a, 304b and dual rear cooling-air intakes 306a, 306b. At the bottom of cooking chamber 301, vent 324 has openings above a removable debris pan 326.

In the embodiments shown in FIGS. 3A-3B, active airflow components with appropriate wiring and power, such as fans, can be provided for one or more of vents 304a, 304b, 306a, 306b, 308, 310, 320 324 while passive components such as holes, openings, or other venting structures can be provided for airflow corridors 302. In other embodiments one or more of these configurations can be different.

Although not shown in FIGS. 3A-3E, the side walls of the modular grill and smoker can be similarly situated such that the airflow corridor 302 creates a fully encompassing hull around the grilling and smoking or other heating chambers, such as chamber 301. As would be understood by those in the art, the grilling and smoking or other heating chambers are necessarily supported and separated from the exterior walls of the airflow corridor creating the hull by internal support structures 340 (shown in FIGS. 3F, 4A-4B) such as posts, ribs, struts, trusses or other structural supports. It should also be understood that the upper airflow corridor exterior walls 312 are similarly supported by structural support means attached to the common walls and they may extend partially or fully circumferentially about the cooking chamber. In many of these embodiments, these internal support structures allow airflow within the airflow corridor 302 to occur substantially unimpeded.

In various embodiments airflow corridors 302 may not extend the full length of a modular grill and smoker apparatus and as such, may not surround a secondary chamber.

FIG. 3C is a side cross-sectional diagram 300c depicting an example embodiment of a modular grill and smoker primary chamber 301 and airflow corridor 302.

FIG. 3D is a side cross-sectional diagram 300d depicting an example embodiment of a modular grill and smoker upper component area cross section. In the example embodiment a vent 320 is a chimney flue as shown and has one or more variable-angle chimney flue doors 328. The chimney flue vent 320 can allow heated air or smoke to escape the interior of the cooking chamber 301 and extends directly to an exterior of the modular grill and smoker. The one or more variable-angle chimney flue doors 328 can be a locking compression lever. This lever can be hinged, can extend partially or fully across an upper area of a modular grill and smoker in various embodiments and can be electrically controlled, mechanically controlled, automatic, manual or semi-automatic in various embodiments. For example, in some embodiments, the lever may be automatically opened to a partial or full configuration if an interior sensor, monitored by a processor, indicates that the internal temperature of the modular grill and smoker is higher than desired for a particular selected, preprogrammed recipe.

Also shown is a cooking chamber LED light strip 336 that can provide illumination to the interior of the cooking chamber 301 and is provided near the chimney flue vent 320 and above food supporting surfaces such as grill plates within chamber 301. LED cooking chamber light strip 336 may have a transparent or semi-transparent cover such that the light can reach the interior of the cooking chamber 301.

Also shown are transparent or semi-transparent panels for viewing the interior of cooking chamber 301. Here, an outer panel 332, inner panel 330 and a panel lock 334 are provided. Panels 330, 332 can be coupled in place using appropriate mechanisms, such that they do not fall off or otherwise move out of place. In some embodiments, this can be a panel lock 334 that is a cam lock, for securing and optionally releasing one or both of outer panel 332 and inner panel 330. While cam locks rely on compression to secure panels in place, other mechanisms are also contemplated. In the diagram, there is a space between outer panel 332 and inner panel 330. This can allow outer panel 332 to remain cool, even while inner panel 330 becomes warm. In embodiments with locking mechanisms, outer panel can be removably or permanently coupled with exterior wall 312 while inner panel 330 is removably or permanently coupled with chamber wall 314. In some embodiments, one or more panels 330, 332 can be slid to a side, up or down or otherwise moved such that a door of chamber 301 does not need to be opened in order to view its contents in smoky or other less-than optimal viewing conditions, thus better maintaining the temperature and conditions within the chamber.

FIG. 3E is a side cross-sectional diagram 300e depicting an example embodiment of a modular grill and smoker lower component area cross section. In the example embodiment a removable debris pan 326 can be flanked by one or more vent openings 324a, 324b and locked in place by a debris pan lock 325. Vent openings 324a, 324b function as cooking chamber air intakes that allow cool air to flow directly from an exterior of the modular grill and smoker into the cooking chamber 301. In some embodiments these are adjustable. Debris pan lock 325 can be unlocked in order to allow a debris pan to be removed and its contents disposed of, such as food, ash or other debris that has fallen into it. Debris pans 326 can hang from a chamber bottom by one or more couplings such as hooks or others in some embodiments. When released or unlocked, gravity can allow them to fall freely or users can carefully remove them by hand.

FIG. 3F is a side cross-sectional diagram depicting an example embodiment of a modular grill and smoker airflow corridor with internal structures 340 shown.

Figure 4A:
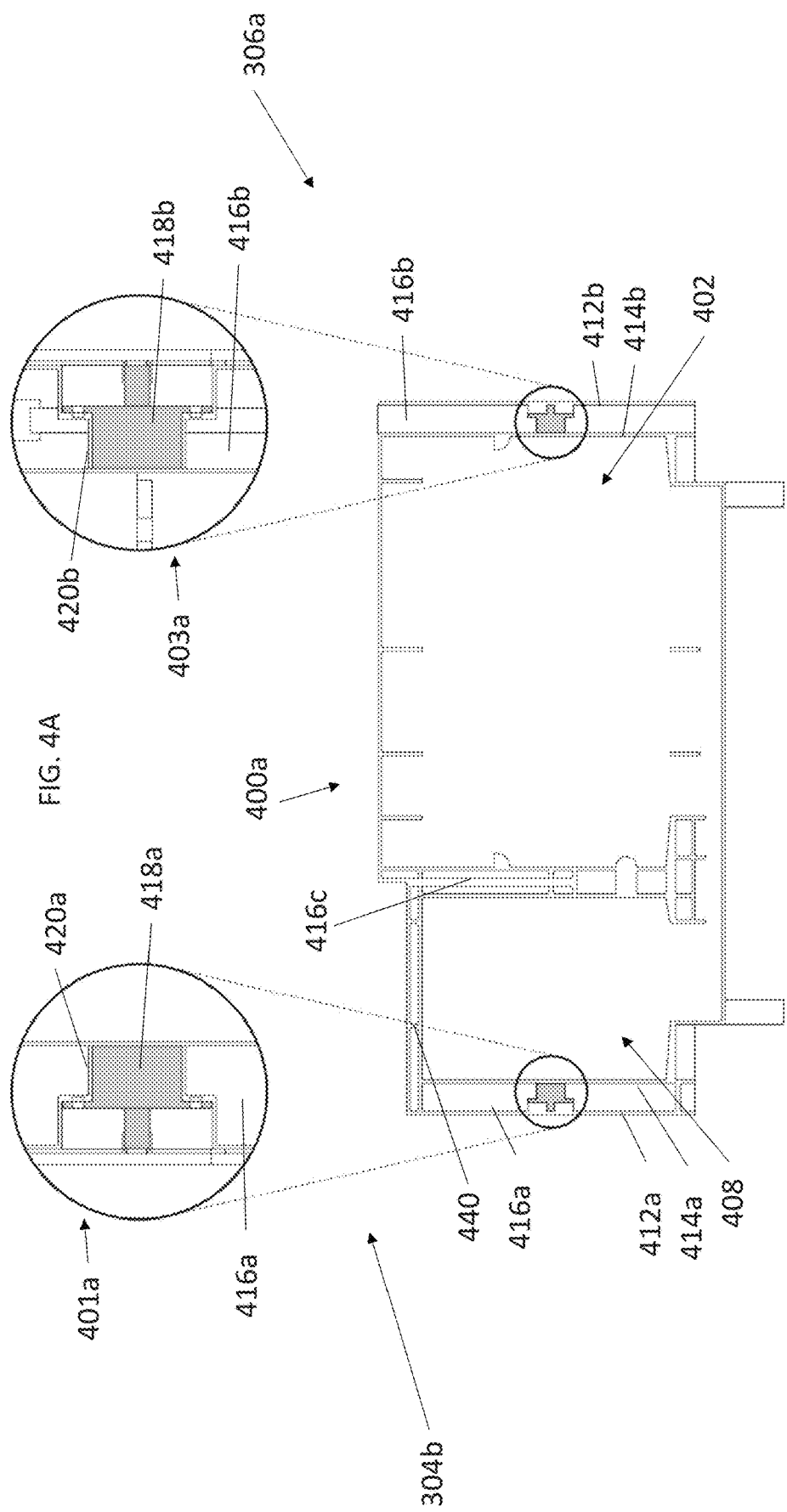
FIG. 4A is a front cross-sectional diagram depicting an example embodiment of a modular grill and smoker with a close-up of rotary dampened door features.

FIG. 4A is a front cross-sectional diagram depicting an example embodiment of a modular grill and smoker 400*a* with enlarged views of rotary dampened door features 401*a*, 403*a*. In the example embodiment, a secondary chamber 408 is shown at the left of the figure while a cooking chamber 402 is shown at the right. Here, chambers 402, 408 have different sizes, both across an interior width or circumference of the chambers and across an interior length of the chambers.

Also shown are ribs that separate an airflow corridor exterior wall 412*a*, 412*b* respectively from a secondary chamber wall 414*a* a cooking chamber wall 414*b*. Ribs 440 can be stainless steel or titanium. In some embodiments a lower coefficient of heat transfer for titanium can prevent exterior walls 412*a*, 412*b* of the airflow corridor from becoming excessively heated. A vertical corridor 416*b* is provided on the exterior side of cooking chamber 402 that can be a separate airflow corridor in some embodiments with two or more airflow vents. A vertical corridor 416*a* is provided on the exterior side of utility chamber 408 that can be a separate airflow corridor in some embodiments with two or more airflow vents. Similarly, an airflow corridor 416*c* can separate utility chamber 408 from cooking chamber 402.

Rotary dampers 418*a* and 418*b* are respectively shown in the enlargements of rotary dampened door features 401*a*, 403*a* and can be provided in these vertical corridors 416*a*, 416*b*, helping to prevent them from becoming too hot, where they are maintained at a working and functional temperature.

Each chamber 402, 408 has a door that can be moved, to from partially to fully open or closed. These chamber doors are permanently or removably coupled with a rotating feature of rotary dampers 418*a*, 418*b*, as they rotate circumferentially about a central axis drawn through the center of the rotary damping mechanisms 418*a*, 418*b*. The rotary damping mechanisms 418*a*, 418*b* can provide sufficient damping, slowing, or friction such that a coupled door will not "clang" or make other loud or disturbing noises if accidentally or purposefully dropped, released, opened or shut quickly or carelessly. Each of the rotary damping mechanisms 418*a*, 41B are provided within a rotary damping support structure 420*a*, 420*b* respectively, such as a cylindrical support structure with an opening at one side and an anchoring means at the other side. In some embodiments, rotary dampers 418*a*, 418*b* can include and contain one or more viscous liquid substances to provide the damping effect.

In other embodiments, rotary damping mechanisms 418*a*, 418*b* can be provided within a cylindrical support structure 420*a*, 420*b* which is closed on both sides and has a slit or channel in the support structure for the door to travel circumferentially about the central axis of each of the rotary damping support mechanisms 418*a*, 418*b* when operated. Cylindrical support structures 420*a*, 420*b* can be coupled to the body of the modular grill and smoker in various appropriate locations by appropriate means such as welding or others. In the example embodiment the rotary damping mechanisms 418*a*, 418*b* are provided within the airflow corridor. In some embodiments, rotary damping mechanisms 418*a*, 418*b* can be coupled to an exterior surface of the modular grill and smoker. In embodiments where a single rotary damping mechanism is coupled with each chamber door, the door can be coupled to a pin, post or other structure with an appropriate receiving mechanism at its side opposite the rotary damping mechanism. Although rotary damping mechanisms 418*a*, 418*b* are shown at relatively the same location on either side of the chambers 402, 408 in the example embodiment, they can be at different locations relative to each other in different embodiments.

FIG. 4B is a front cross-sectional diagram depicting an example embodiment of a modular grill and smoker 400*b* with enlarged views of rotary dampened door features 401*b*, 403*b*. In the example embodiment, interior details of primary chamber 402 are shown in greater detail including racks 432, windows 430, supports 434, and others.

FIG. 4C is a side view depicting an example embodiment of a modular grill and smoker 400*c* with an enlarged view of rotary dampened door features 403*c* and lighting mechanism 436.

FIG. 4D is a cutaway perspective view depicting an example embodiment of a modular grill and smoker 400*d* with a rotary dampened door feature. In the example embodiment the rotary damping mechanism 418*d* includes a shaft 442 that can be coupled with a complementary shaped receiver 444 of a door. As such, the door movements can be damped at one or more points in an opening or closing movement while a main body 448 of a rotary damper 418*d* remains stationary. In an example embodiment, movements are damped most robustly near the end of an opening or closing movement.

FIG. 5A is a front perspective view depicting an example embodiment of a modular grill and smoker multi-surface table 500. In the example embodiment a plurality of legs 502 are shown that support a first panel 504 with a planar upper surface on which a modular grill and smoker can be placed or mounted. Also shown, in some embodiments, holes 506, cutouts, ridges, lips and other structures can be provided in the upper surface that extend partially into or through panel 504, as appropriate, to maintain a position of a modular grill and smoker by permanent, semi-permanent or removable couplings.

It should be understood that multi-surface tables 500 and supporting racks (e.g., see supporting rack 222 of FIG. 2A-2C) can be sized based on individual modular grill and smoker sizes. As such, they are highly customizable, in accordance with the unique fabrication techniques described herein.

Also shown is a second panel 508 with a planar upper surface, and coupled to the legs for support such that it is substantially parallel to the first support surface. In use, this second surface can provide support for dishes, utensils, or any other objects that a user may wish to place in the space between its upper surface and a substantially planar lower surface of the first panel. Also shown is a third panel 510 with a planar upper surface and a cylindrical cutout 512 for supporting an external fuel tank.

Similar to the orientation of the first panel 504 and second panel 508, the third panel 512 can be parallel to the first two panels 504, 508. The distance between the lower surface of the first panel 504 and the upper surface of the third panel 510 is such that an external fuel tank can be conveniently removed and replaced. The circumference of the cylindrical cutout 512 should be such that it is larger than a cylindrical lower extension of an external fuel tank but smaller than a largest circumference of the external fuel tank. As such it can support the external fuel tank above the ground or other support structure on which the multi-surface table 500 is placed, i.e. a deck, patio, or others.

Although three panels 504, 508, 512 are shown in the example embodiment it should be understood that one or more of a back, side or front panels can also be provided that are substantially perpendicular to the upper planar surface of the first panel 504. In some embodiments, these panels can be doors with hinges or latches that allow them to open and close internal compartments. Holes, gaps, spaces or other cutouts should be provided in any such panels such that the external fuel tank can be coupled with the modular grill or smoker. Additionally, in some embodiments, racks, drawers and other accessory specific components and compartments can be provided to hold towels, utensils and other common pieces of equipment. Although described herein as a multi-surface table, in some embodiments a single surface may be provided.

FIG. 5B is a front perspective view depicting an example embodiment of a modular grill and smoker multi-surface table 500 with a modular grill and smoker 550 and external fuel source 552. In the example embodiment the modular grill and smoker 550 has four support legs 554 that are coupled with holes 506 (obscured).

In some embodiments, modular grill and smoker 550 may be attached or coupled to the table 500 on a permanent, semi-permanent or removable basis. In embodiments where modular grill and smoker 550 can be removed or decoupled from multi-surface support table 500, it can be transported to other locations for assembly, cleaning, modification or other purposes and goals. Coupling structures (obscured) in the form of external fuel coupling components may be provided with coupling locations for multiple external fuel sources, including external fuel source 552 on one side. It is understood in the art that these couplings can route external fuel within the interior of the modular grill and smoker 550 through appropriate pipes, hoses, or other sealed compartments to appropriate, safe and desirable locations for providing heat and other desired characteristics. An external power coupling can operably connect internal or external electrical grill components to an external power source such as a standard wall socket, for instance, using a power cord (not shown). In some embodiments, backup or primary battery sources can also be included.

FIG. 5C is a back view depicting an example embodiment of a paired modular grill and smoker multi-surface table with a modular grill and smoker and external fuel source FIG. 6A is a front perspective view depicting an example embodiment of a modular grill and smoker support rack 600. In the example embodiment, the support rack 600 can be coupled or mounted to a railing, panel, or other permanent or semi-permanent fixture or structure using one or more adjustable mounting hooks 602, such that it hangs or projects upward and supports a modular grill and smoker above a lower surface such as a ground, patio, floor, deck, or similar.

The support rack 600 as shown includes posts or leg locks 604 that can couple to complementary mechanisms of the modular grill and smoker. Other couplings are also contemplated. The support rack 600 also includes an arm extension 606 for supporting an external fuel tank that extends from or couples with a support structure 608 and includes an external fuel tank support ring 610. In the example embodiment this arm extension 606 projects downward but in other embodiments it may be projected horizontally or in other directions as appropriate. The external fuel tank support ring 610 can be referred to as a LPG tank rank, external fuel tank rack or otherwise. Dimensions of the interior of the cylindrical ring 610 can be similar to those described previously for supporting an external fuel source with respect to the third panel of FIG. 5A.

The support rack 600 can also include additional planar surfaces for supporting dishes, utensils and other items in some embodiments as well as separate or common enclosures for housing one or both of a modular grill and smoker and external fuel source. While in some embodiments the support rack 600 provides a fixed height for a modular grill and smoker, this can be adjusted in other embodiments and changed per user requirements or desires. In some embodiments this can be done by adjusting support structure 608 up or down with respect to arms 602 before locking into place using an appropriate locking mechanism or pin.

Figure 6B:
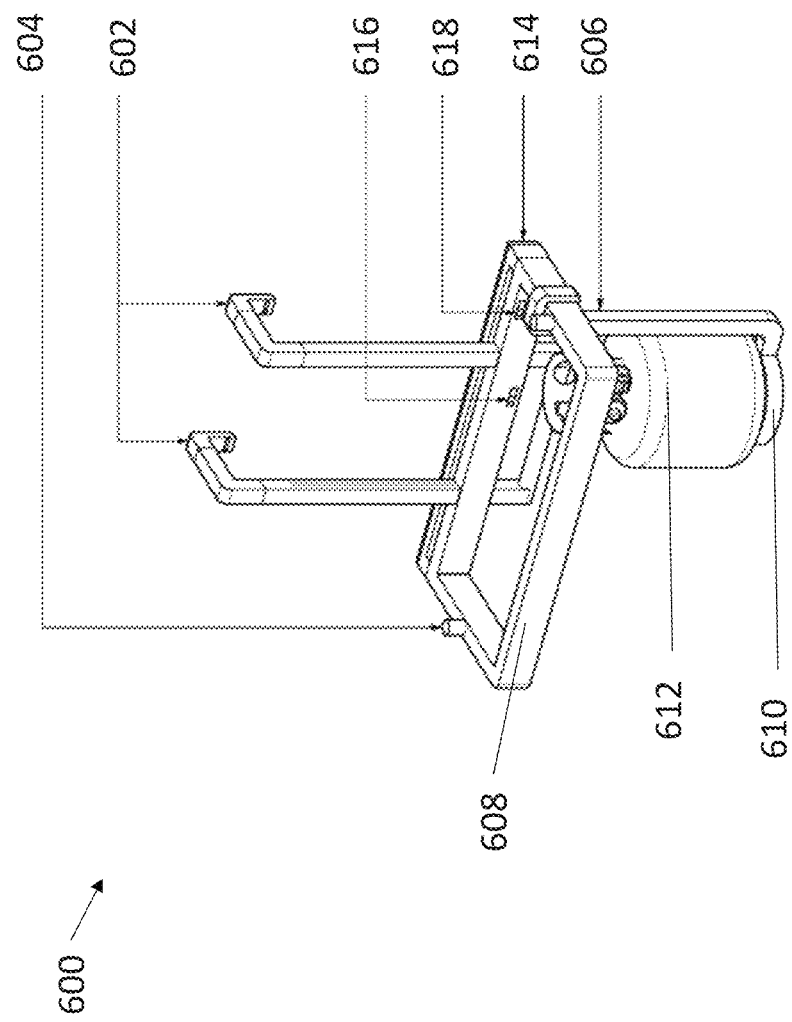
FIG. 6B is a front perspective view depicting an example embodiment of a modular grill and smoker support rack with a mounted external fuel source.

FIG. 6B is a front perspective view depicting an example embodiment of a modular grill and smoker support rack 600 with a mounted external fuel source 612. A main body 608 of the support rack can be a rectangular bar structure. A rubber or other compression bar 614 can be coupled to a side of the main body on a same side that adjustable mounting hooks 602 project from, in order to provide a protective surface so as not to damage a supporting structure mounting location, such as a railing. Height adjustment release 616 and pitch adjustment release 618 can be provided to allow users to adjust the height of the main body 608.

FIG. 6C is a front perspective view depicting an example embodiment of a modular grill and smoker support rack 600 with a mounted external fuel source 622 and modular grill and smoker 622.

FIG. 7A is a front cutaway view depicting an example embodiment of an assembled modular grill and smoker 700 with individual component details. In the example embodiment, a rotisserie mechanism can include one or more upper gears 730, one or more belts 732, one or more motors 734 and one or more complementary lower gears 736 to rotate a rotisserie rack 738 about its central axis. A grill door damper 740 and utility door damper 742 can be coupled with the apparatus as described elsewhere herein.

Also shown are an electrical junction and central processing unit (CPU) box 752 for housing and protecting electrical equipment used with the modular grill and smoker 700. Secondary chamber 708 includes at least one utility shelf 742, utility door rotary damper 744, and fuel line 746. Also shown are debris tray 760, debris tray lock 762, ignition mechanism 764, fuel burner 766.

FIG. 7B is a front view depicting an example embodiment of a modular grill and smoker 700b with a rack with individual component details. In the example embodiment a cooking chamber door of the modular grill and smoker is shown in an open configuration. Also shown are internal components such as ceramic panels 770, grills 772 and fuel trays 774 (as shown in FIG. 7E). In some embodiments, ceramic panels can be high-temperature ceramic-infrared panels for use with LPG/NG fuel sources. Alternative solid fuel trays 774 can be used for one or both of charcoal, wood or other fuel sources. Cooking grills 772, warming grills 772, and debris trays 760 are also shown. Window assemblies can be double glazed viewing glass in some embodiments comprised of dual panels of glass, one interior and one exterior. Also shown are removable chimney flues 780 and debris trays 760.

FIG. 7C is a view depicting an example embodiment of modular grill and smoker individual component details, some of which are also shown in FIG. 7B. Window panel related components include inner glass 790, spacer 792, outer glass 794, and lock 796.

FIG. 7D is a view depicting an example embodiment of modular grill and smoker external component details, some of which are also shown in FIG. 7B as well as a modular grill and smoker front view. Shown in the example embodiment is a window lock 796.

FIG. 7E is a view depicting an example embodiment of modular grill and smoker internal component details, some of which are also shown in FIG. 7B. Shown in the example embodiment is an internal burner component for an external fuel source. In the example embodiment this can be a LPG burner, NG burner or combination burner 766.

FIG. 8 is a chart 800 depicting an example embodiment of modular grill and smoker component dimensions for different sized modular grills and smokers. Various component dimensions are described in the table with respect to the size of modular grill and smoker they may be used.

Figure 9:
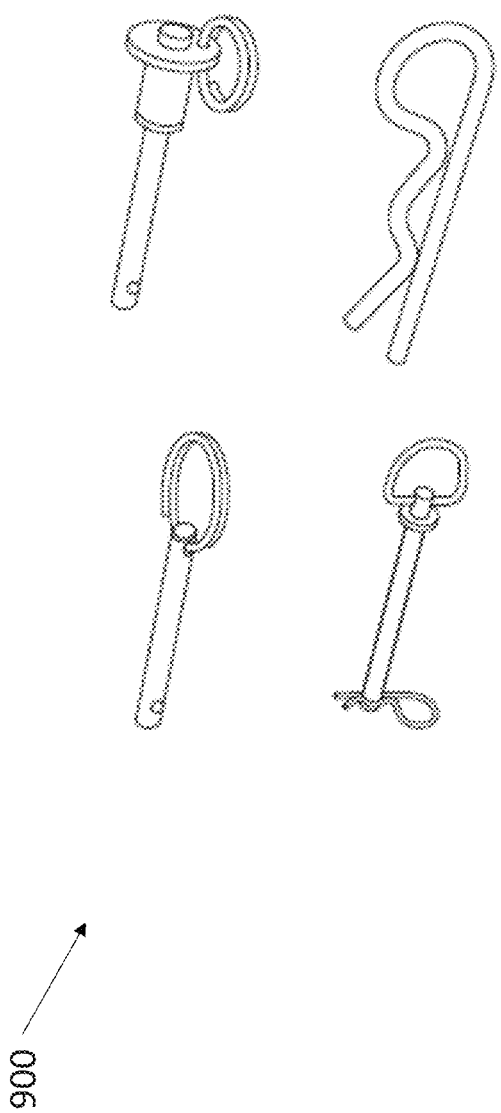
FIG. 9 is a front view depicting an example embodiment of modular grill and smoker securing pins.

FIG. 9 is a front view depicting an example embodiment of modular grill and smoker securing pin 900s. In the example embodiment, pins with rings, flanged edges, angled lengths, hook and clasp mechanisms are shown. Various others are contemplated as would be understood in the art for use with the modular grills and smokers described herein.

Figure 10:
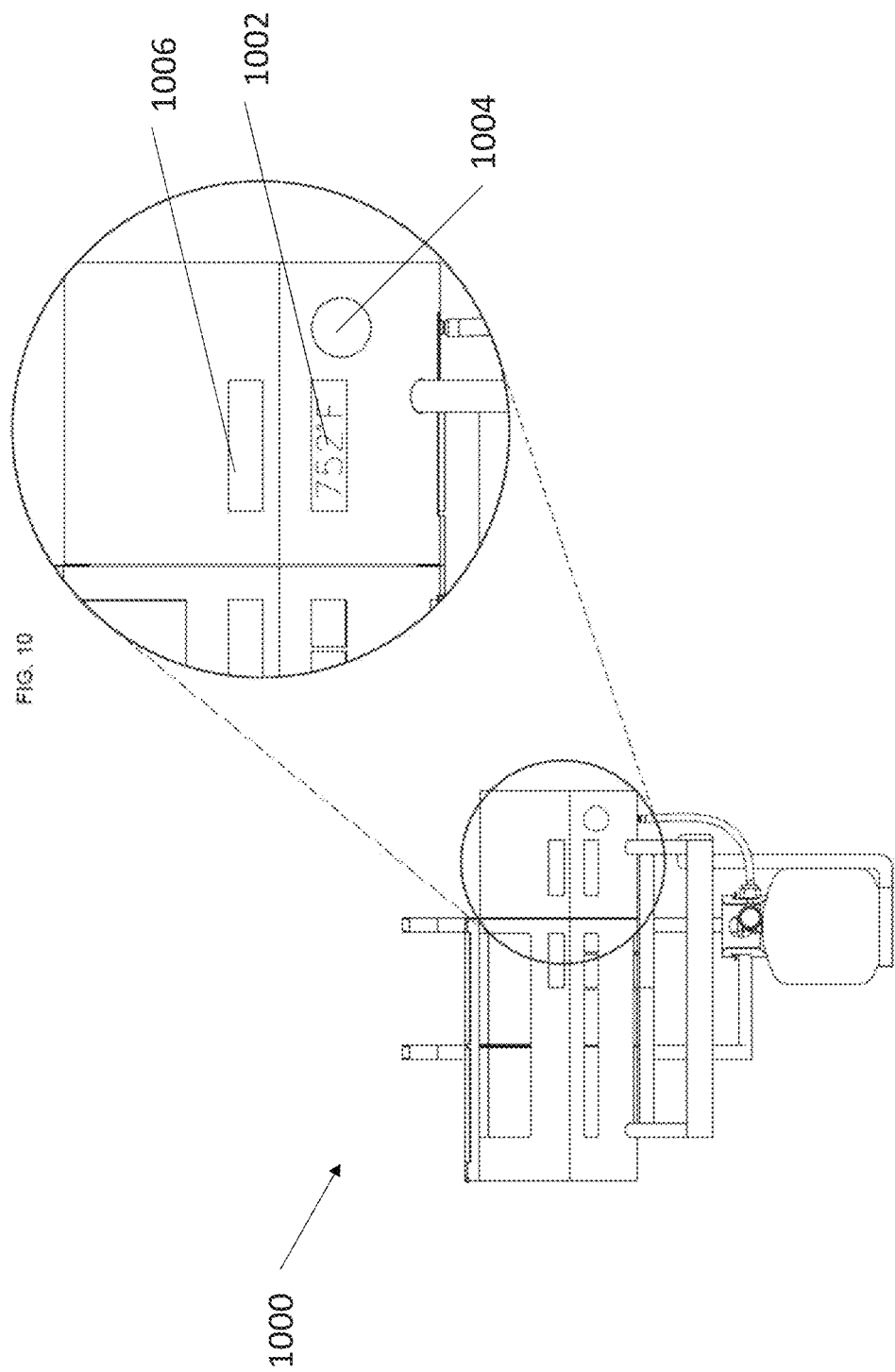
FIG. 10 is a front view depicting an example embodiment of a modular grill and smoker display.

FIG. 10 is a front view depicting an example embodiment of a modular grill and smoker 1000 with enlarged display 1002 view. In the example embodiment a dial or knob 1004 can be used to adjust an internal temperature of the modular grill and smoker 1000 and a user can monitor the internal temperature by reading a display 1002 that can be coupled to an internal thermometer and operative to accurately display the temperature. A handle 1006 is also shown. Various other displays can also be used, as previously described and it should be understood that appropriate power sources such as batteries or electrical wall plugs, internal processors and memory and others can be operatively electrically connected as necessary. Internal wiring harnesses are provided in various embodiments to maintain electrical wires in safe positions and intuitive locations and configurations for easy maintenance.

Figure 11:
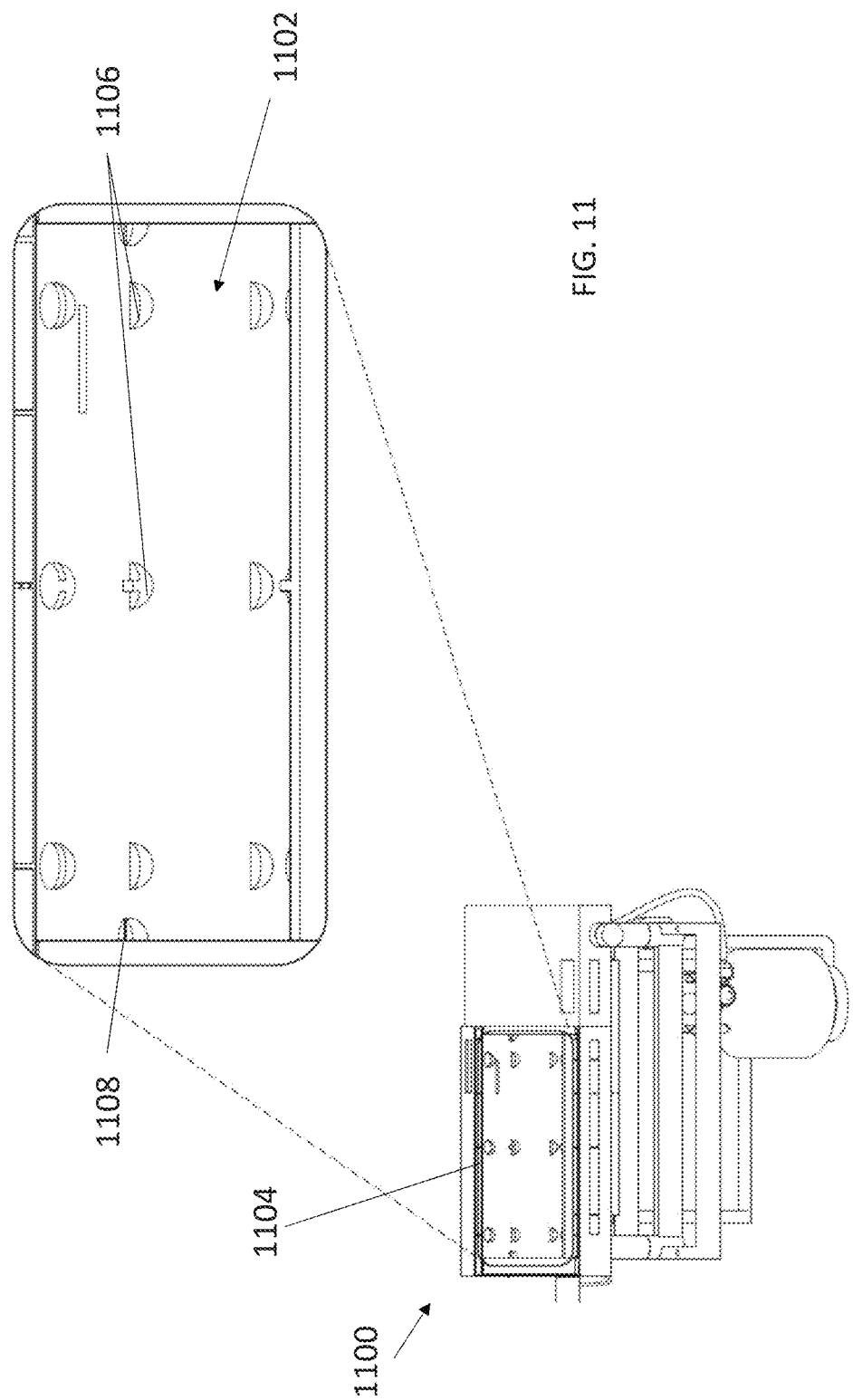
FIG. 11 is a front view depicting an example embodiment of a modular grill and smoker interior chamber with an open door.

FIG. 11 is a front view depicting an example embodiment of a modular grill and smoker modular grill and smoker 1100 with enlarged interior cooking chamber 1102 view with an open cooking chamber door 1104. The interior of the cooking chamber 1102 is shown as a substantially horizontal cylindrical chamber having an internal radius and flat end walls. Also shown are rack holders 1106.

It should be understood that various internal structures can be provided that partition the interior of the interior chamber without departing from the scope of the invention. For example, a lower portion of the chamber can be partitioned into two sides to allow for the user of one fuel source in a first side of the chamber and another fuel source in a second side of the chamber. As such, users may receive the benefit of unique flavor combinations imparted by the differing fuel sources without having the fuel sources combine or interact directly, which could lead to undesirable flavor characteristics. Similarly, the chamber can be divided such that airflow characteristics within the chamber are optimized for different objectives in particular orientations.

It should be understood that although the modular grill and smoker 1100 shown in the embodiments herein is generally a cylinder with a horizontal length oriented about a central axis, various other configurations and dimensions are contemplated without departing from the principles and objectives described herein. For instance, a vertically oriented modular grill and smoker is contemplated, with a central axis running in a vertical orientation, perpendicular with a ground surface. Different cross sections can be provided in various embodiments including triangular, square, elliptical, rectangular, irregular polygonal, and others. Likewise, the general three-dimensional profile is not limited to having two ends. Three dimensional profiles contemplated for various embodiments include pyramids, boxes and others. Likewise, irregular and non-traditional profiles and orientations are also contemplated, such as helixes and others. A variety of different benefits may be imparted by the various shapes and profiles of the modular grills and smokers contemplated including airflow optimization within the main and secondary chambers, insulation optimization at or near the exterior surfaces of the chambers, optimized and unique flavor profiles and numerous other benefits.

The internal surfaced of chambers can be coated in black, heather, charcoal or other dark colored materials that can provide utility in the form of reduced necessity to clean the interior of unsightly charring as is common on polished metal surfaces inside grills commonly in use today. Interior surface materials can be selected or applied in order to create other beneficial characteristics as well such as improved heat absorption, insulation, or others. In some embodiments, interior surfaces of one or more of the cooking and secondary chambers can be anodized stainless steel. As such, a chemical treatment reacts with the stainless steel and creates a pocked surface. In some embodiments a powder paint can be applied to interior surfaces that can be heat resistant and can be high gloss. This can lead to the benefit of improved cleaning of the associated surfaces. In some embodiments, chamber interiors can be coated in ceramic. In various embodiments the interior treatments of the chambers can be applied robotically in a fabrication plant.

Various internal structures 1106 can be provided as shown to support racks, food grilling surfaces, heating or warming surfaces, smoking surfaces or others as appropriate and known in the art. The height, location and orientation of these will be apparent through normal experimentation and may be highly customizable. Also provided can be hooks or other supports 1108 for rotisserie racks or other internal grill components.

FIG. 12 is a view depicting an example embodiment of modular grill and smoker external fuel tanks 1200. In the example embodiment, external fuel tanks 1200 can include specific modifications or structures to optimize their use with the modular grills and smokers and associated support structures disclosed herein. These can include collars, flanges, grommets, rings, and others.

Figure 13:
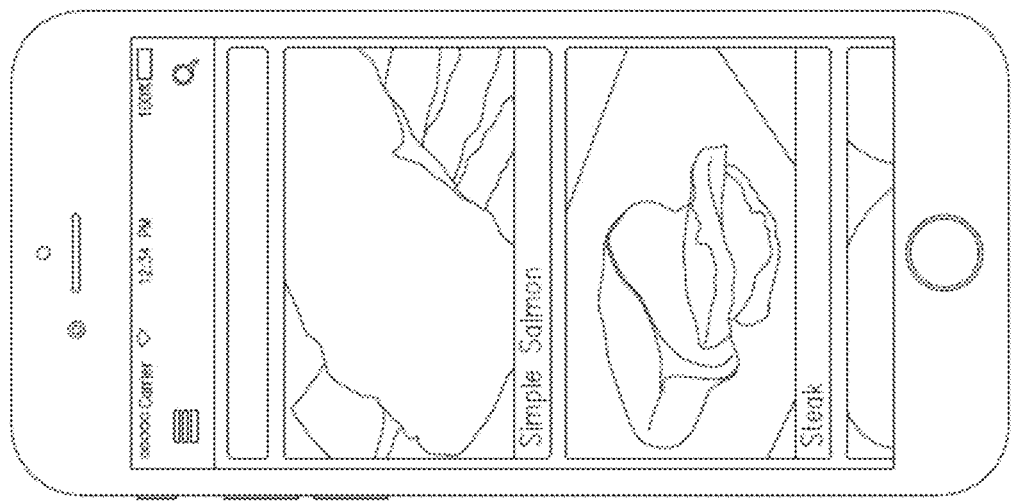
FIG. 13 is a user interface display depicting an example embodiment of a modular grill and smoker recipe selection screen.

FIG. 13 is a user interface display 1300 depicting an example embodiment of a modular grill and smoker recipe selection screen. In the example embodiment, a user interface display 1300 is shown that allows a user to select a recipe from a database provided on a server that can upload particular recipes to user devices such as mobile smartphones, tablet computers, laptops, or others. Recipes can include specific instructions for cooking particular dishes including preheating, cooking timers, temperatures, alerts and other important information that can be displayed on the user device as well as implemented in the form of instructions, stored in non-transitory computer memory and executable by a computer processor for controlling a device such as a modular grill and smoker with internal memory and automated cooking features. User interface displays can be interacted with via user interfaces such as touchscreens, buttons, and others.

Figure 14:
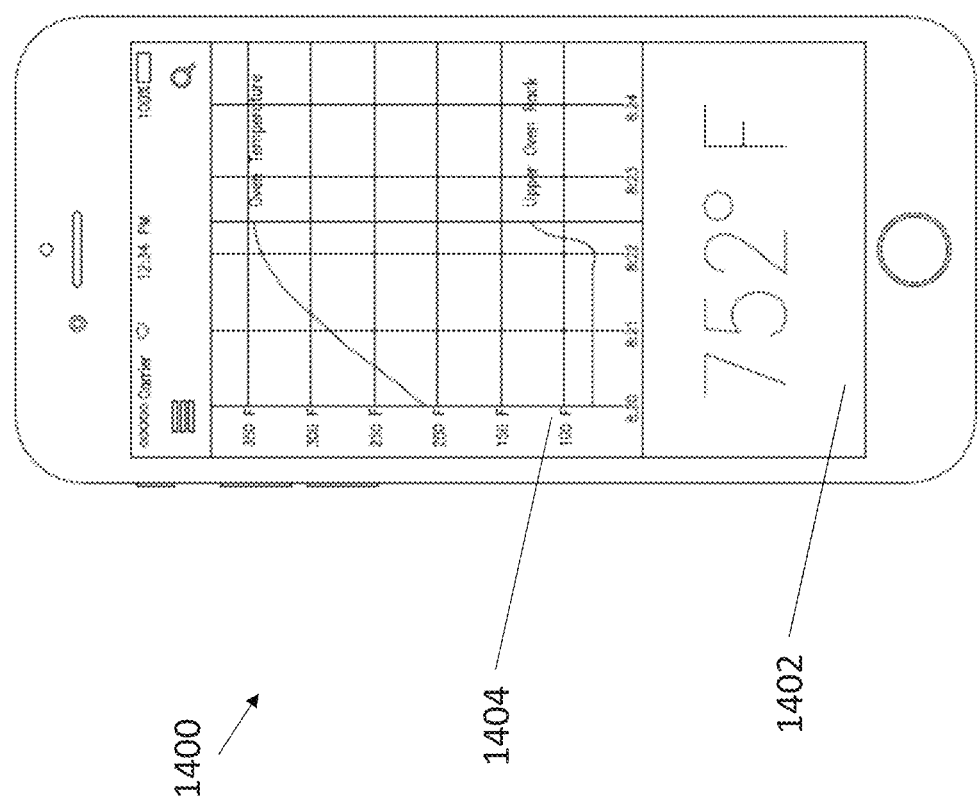
FIG. 14 is a user interface display depicting an example embodiment of a modular grill and smoker temperature display screen.

FIG. 14 is a user interface display depicting an example embodiment of a modular grill and smoker temperature display screen 1400. In the example embodiment, a current internal chamber temperature 1402 can be shown as monitored by one or more thermometers located in one or more locations adjacent to or within the chambers of the associated modular grill and smoker. Internal smokiness can also be measured by appropriate sensors at internal locations and airflow within airflow corridors. Exterior surface temperature can also be monitored and displayed. A recipe progress is displayed in the area of the user interface above the temperature display and can show heating curves and characteristics, timing information and other information such as recipe specific information and instructions for a user to follow. Communication between a user device and a modular grill and smoker can be provided by appropriate transmitters and receivers operating using known or future developed protocols such as Wi-Fi, Bluetooth, cellular and other standards. Different heating profiles 1404 can be shown as well, such as the oven temperature and upper oven rack temperature profiles here.

Figure 15:
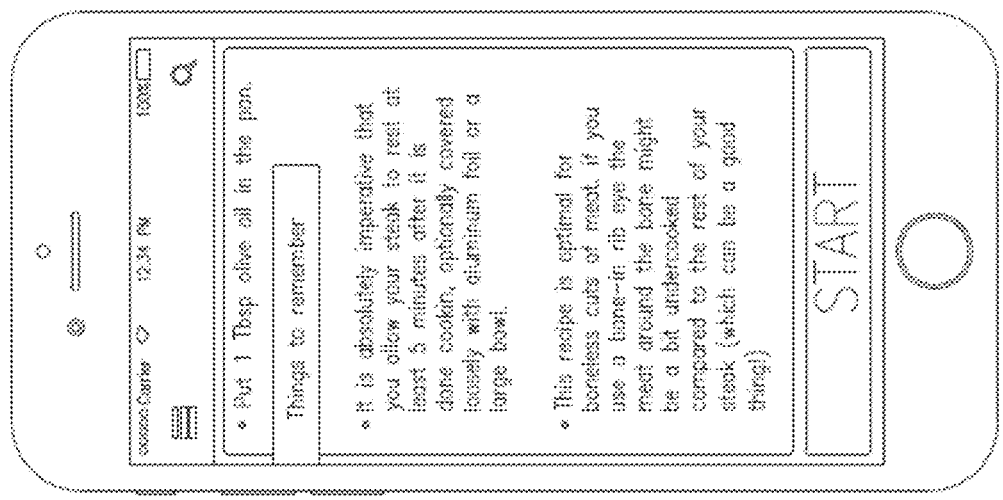
FIG. 15 is a user interface display depicting an example embodiment of a modular grill and smoker instructions screen.

FIG. 15 is a user interface display depicting an example embodiment of a modular grill and smoker instructions screen 1500. In the example embodiment, instructions can be displayed and manipulated, for instance by scrolling, that provide an overview of the recipe, detailed instructions, other user reviews, troubleshooting tips, frequently asked questions (FAQs) and other pertinent information.

Figure 16:
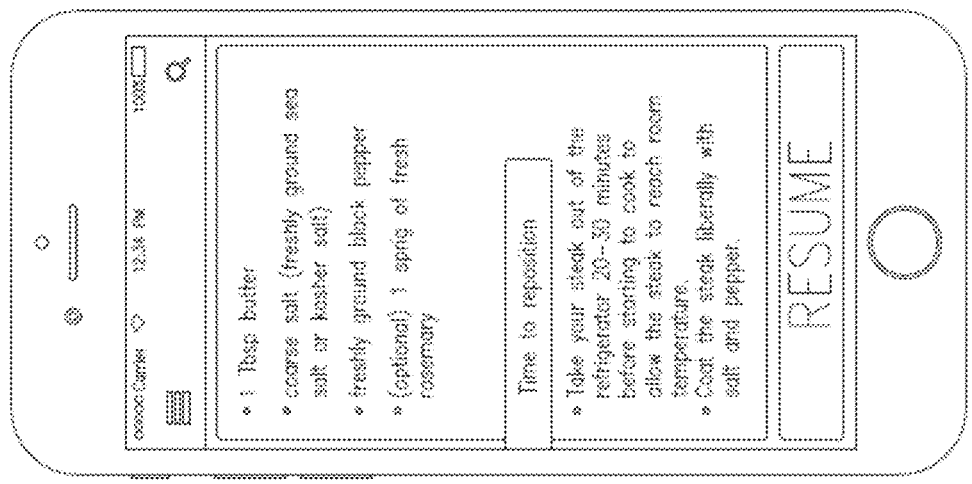
FIG. 16 is a user interface display depicting an example embodiment of a modular grill and smoker recipe instruction view screen.

FIG. 16 is a user interface display depicting an example embodiment of a modular grill and smoker recipe instruction view screen 1600. Here, a user can view various timers that can correspond to when a user should put specific food items in the associated modular grill and smoker, when to remove specific food items, when to move specific food items between racks or chambers, when to check on food items, alerts, user interaction such as messaging with other users or system operators or employees, and others.

Figure 17:
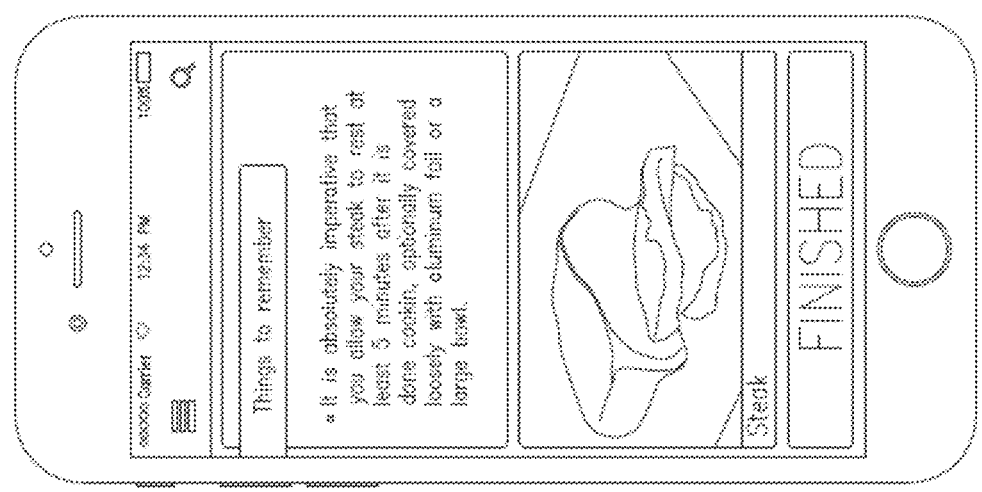
FIG. 17 is a user interface display depicting an example embodiment of a modular grill and smoker recipe completion screen.

FIG. 17 is a user interface display depicting an example embodiment of a modular grill and smoker recipe completion screen 1700. Here, a user can view final preparation instructions, removal instructions, cleaning instructions, reminders, tips or others information.

Figure 18A:
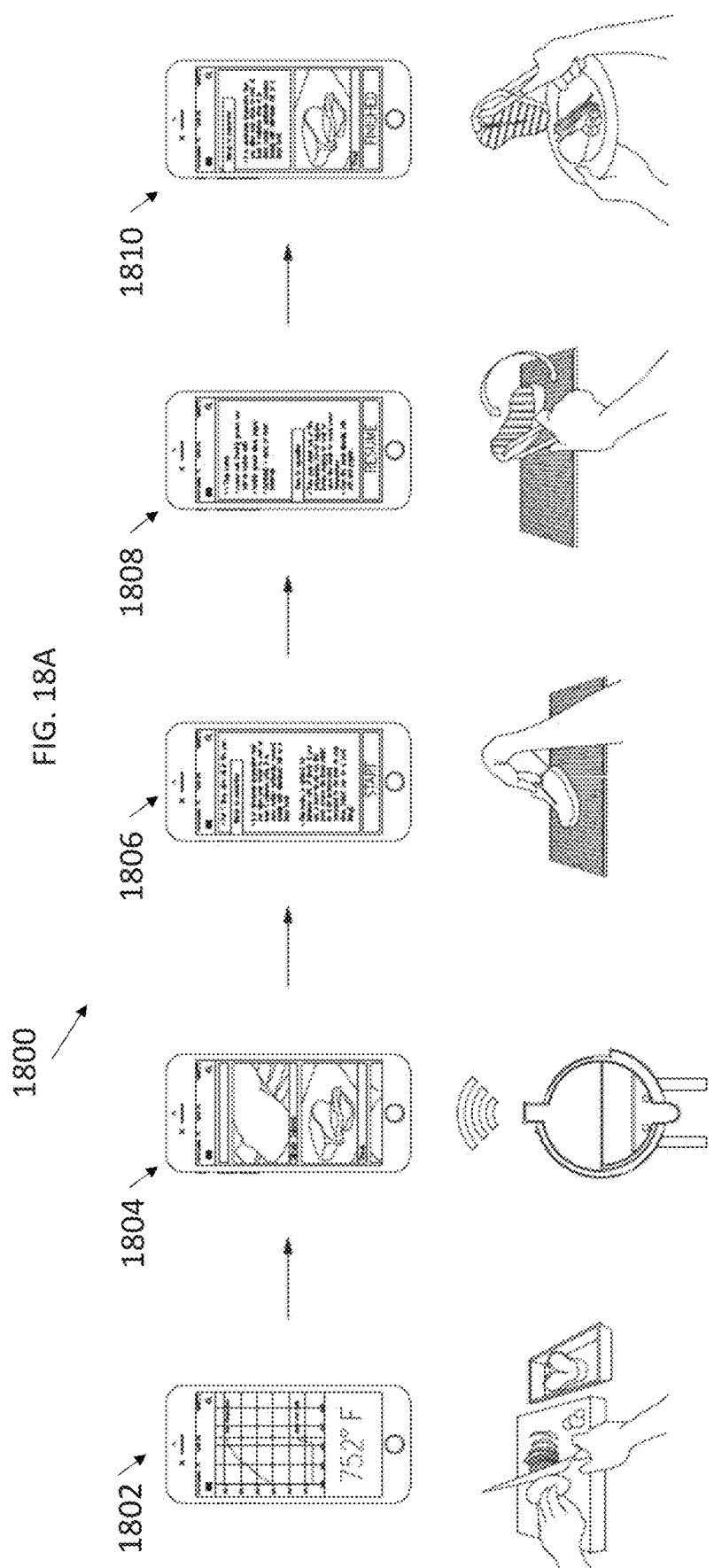
FIG. 18A is a flowchart depicting an example embodiment of a modular grill and smoker use process.

FIG. 18A is a flowchart depicting an example embodiment of a modular grill and smoker use process 1800. In the example embodiment a user can first select a desired, adjustable/tunable automated recipe program previously downloaded from company server to local storage; and prepare food for grilling and/or smoking in step 1802 while the grill and smoker is heating. Next a user can initiate an automated-recipe sequenced cooking program and make changes if necessary via a computer network; the grill preheats if grill door is open, while preheating does not initiate and the user is pinged to close door before gas is ignited; at a desired temperature, grill pings (locally and remotely) for food placement in step 1804. User can then open the grill door and place the food; close the door and indicate completion of food placement, resuming automated-recipe cooking program and monitor as appropriate in step 1806. The grill can initiate an automated recipe cooking countdown in step 1808 (varying temperature during cooking as directed by recipe); the grill can initiate pings (locally and remotely) for food turning/repositioning; and the user can reposition food, and indicate resumption of automated recipe cooking program. At the conclusion of an operation, the program can execute a gas shutoff and ping a user (locally and remotely) for food removal in step 1810. A manual/local operation-gas knob can incorporate an ignition trigger and the cooking-chamber can also include LED light strip controls.

In various embodiments, the user devices and modular grill and smoker apparatuses can perform complete logging of all system & user activity, including timestamps, locations, notes, technical issues and other information, allowing a user to perform queries of all historical data.

Figure 18B:
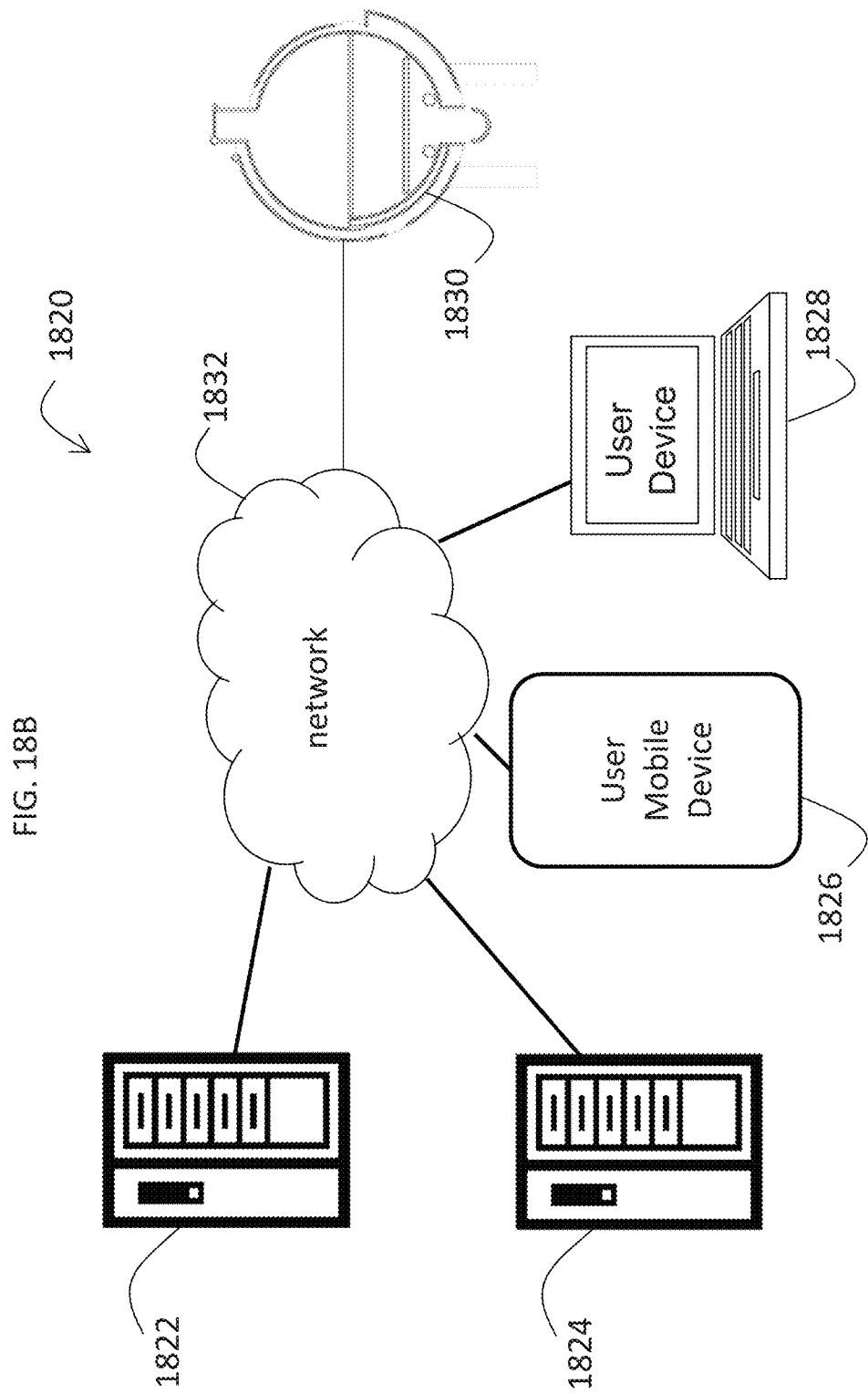
FIG. 18B is an example view of a basic network setup according to an embodiment of the present invention.

FIG. 18B is an example view of a basic network setup 1820 according to an embodiment of the present invention. In the example embodiment, a server system 1822, 1824 with multiple servers is shown. Each server 1822, 1824 can include applications distributed on one or more physical servers, each server having one or more processors, memory banks, operating systems, input/output interfaces, and network interfaces, all known in the art, and a plurality of end user devices 1826, 1828 coupled to a network 1832 such as a public network (e.g. the Internet and/or a cellular-based wireless network, or other network) or a private network. User devices 1826, 1828 include for example mobile devices (e.g. phones, tablets, or others) desktop or laptop devices, wearable devices (e.g. watches, bracelets, glasses, etc.), other devices with computing capability and network interfaces and so on. The server system includes for example servers 1822, 1824 operable to interface with websites, webpages, web applications, social media platforms, advertising platforms, and others.

Figure 18C:
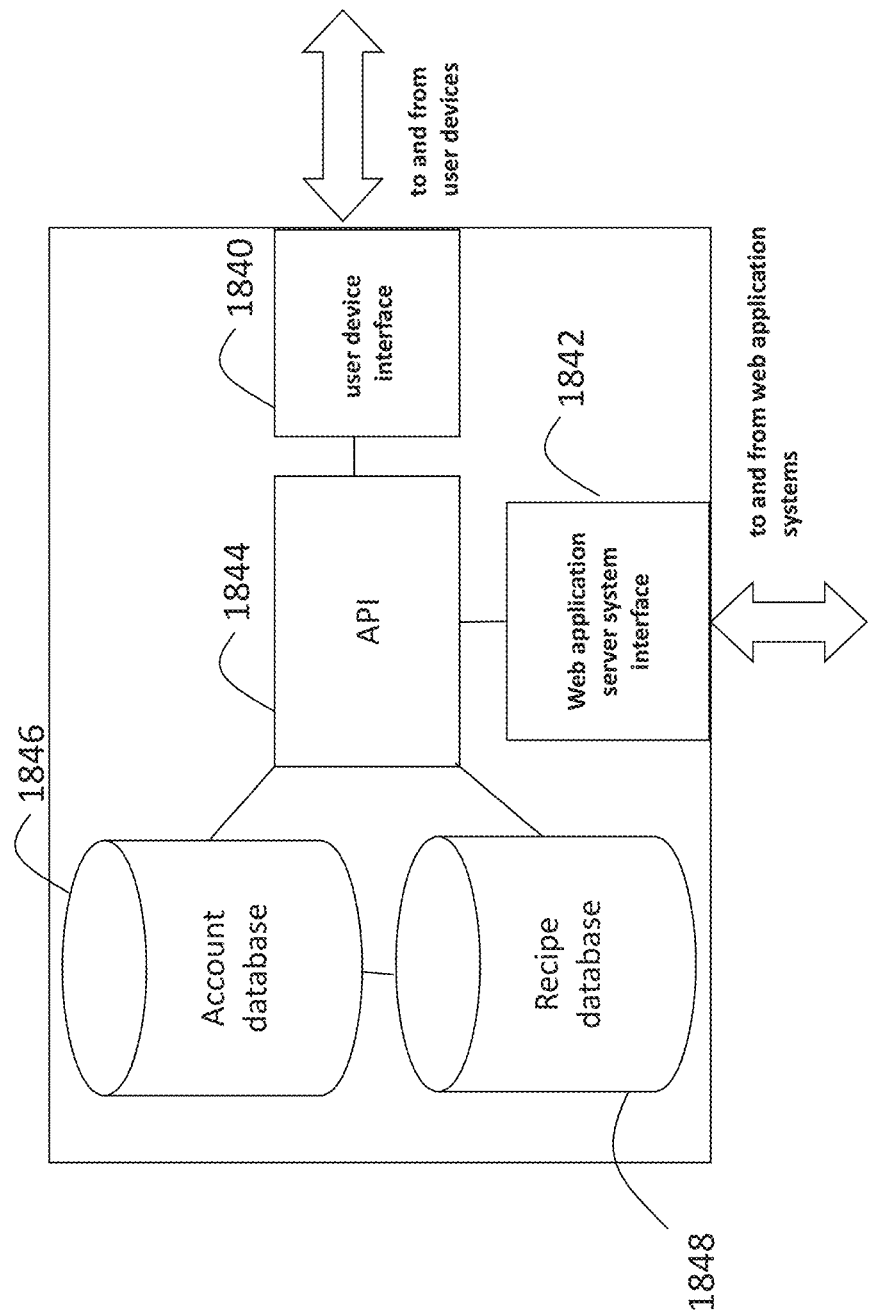
FIG. 18C is an example view of a network connected server system according to an embodiment of the present invention.

FIG. 18C is an example view of a network connected server system 1822 according to an embodiment of the present invention. A server system 1822 according to an embodiment of the invention can include at least one user device interface 1840 implemented with technology known in the art for communication with user devices as described elsewhere herein or developed in the future. The server system 1822 can also include at least one web application server system interface 1842 for communication with web applications, websites, webpages, websites, social media platforms, and others. The server system 1822 can further include an application program interface (API) 1844 that is coupled to at least one database 1846, 1848 and can communicate with interfaces such as the user device interface and web application server system interface, or others. The API 1844 can instruct the databases 1846, 1848 to store (and retrieve from the databases) information such as user account information, recipe information, associated account information, instructional information, warranty information, communication information or others as appropriate. The databases 1846, 1848 can be implemented with technology known in the art such as relational databases and/or object oriented databases or others.

Figure 18D:
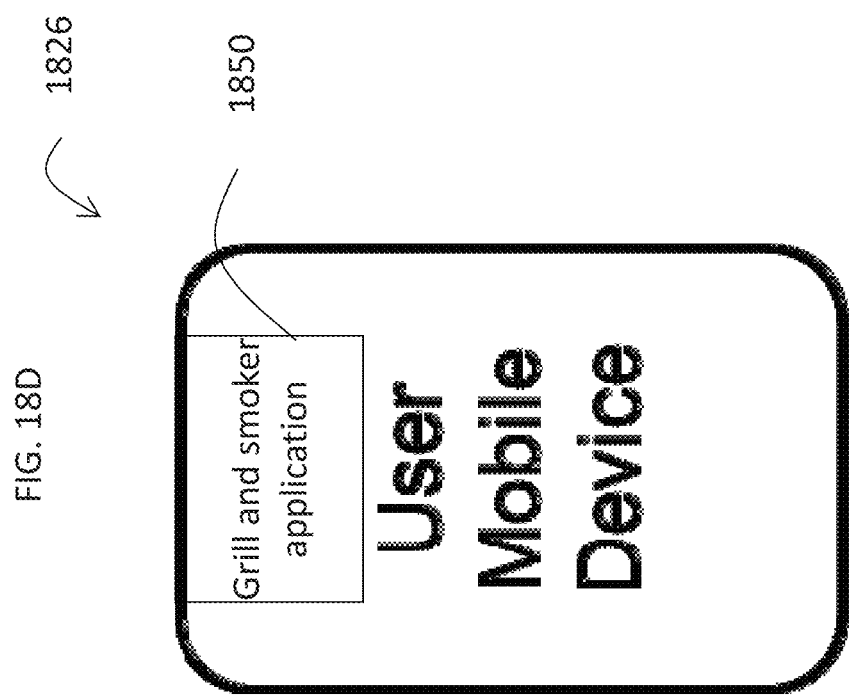
FIG. 18D is an example view of a user device according to an embodiment of the present invention.

FIG. 18D is an example view of a user mobile device 1826 according to an embodiment of the present invention. In an example embodiment, a user mobile device 1826 according to an embodiment of the invention can includes a network connected application 1850 that is installed in, pushed to, or downloaded to the user mobile device. In many embodiments, user mobile devices are touch screen devices. The applications can include recipe information for viewing and downloading on a user device, communicating with other users, saving information, controlling networked grill and smoker devices (remotely or locally), and others.

Mobile applications, mobile devices such as smart phones/tablets, application programming interfaces (APIs), databases, social media platforms including social media profiles or other sharing capabilities, load balancers, web applications, page views, networking devices such as routers, terminals, gateways, network bridges, switches, hubs, repeaters, protocol converters, bridge routers, proxy servers, firewalls, network address translators, multiplexers, network interface controllers, wireless interface controllers, modems, ISDN terminal adapters, line drivers, wireless access points, cables, servers and others equipment and devices as appropriate to implement the method and system is contemplated.

Figure 18E:
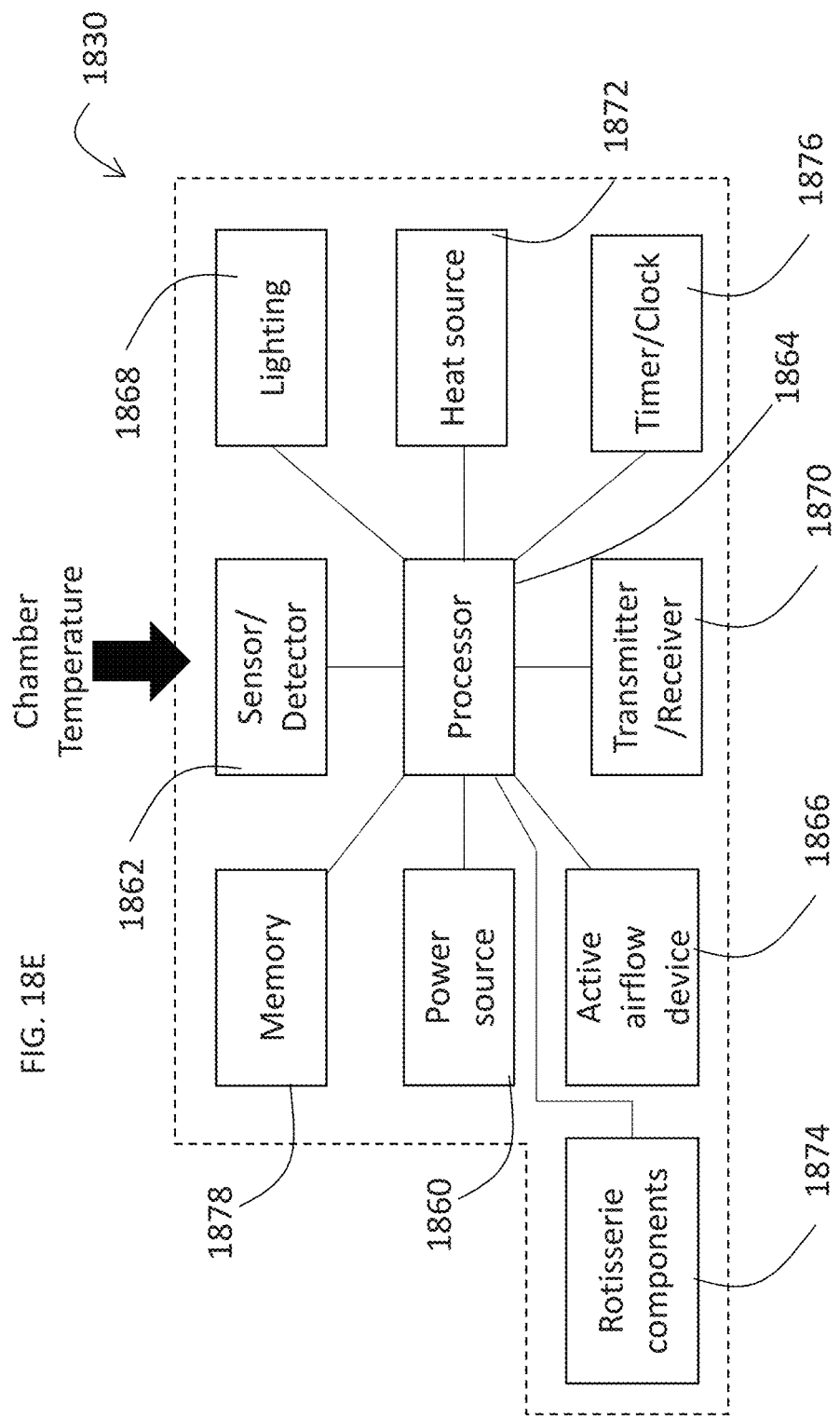
FIG. 18E is a diagram of an example embodiment of a modular grill and smoker device electrical system.

FIG. 18E is a diagram of an example embodiment of a modular grill and smoker device 1830 electrical system diagram. In the example embodiment a power source 1860 such as a power cable can be electrically coupled to provide power to the electrical system of the grill and smoker device. A sensor or detector 1862 can sense or detect temperature within a chamber and this information can be processed using one or more processors 1864 that can control active airflow devices 1866 such as heat sources, fans, electrically controlled vents, or other devices to modify the temperature within the chamber. Also provided in some embodiments, can be processor 1864 controlled lighting 1868 for illuminating the interior of a chamber. At least one transmitter, receiver or combination thereof 1870 can be communicatively coupled (wirelessly or wired) with a private or public network in various embodiments for transmitting temperature, timing, alerts and other pertinent information and for receiving recipe heating, timing, lighting and other information. The at least one processor 1864 can store recipe information in local memory 1878 for later use such as timing 1876, heating 1872, rotisserie control 1874, lighting and other information, that can each have their own connected system or subsystem. It should be understood that all electrically components are wired so that they are operable for their intended purpose as would be understood by one in the art. Likewise, various component functions can be added, distributed, modified or omitted with additional or fewer components in various embodiments.

Figure 19A:
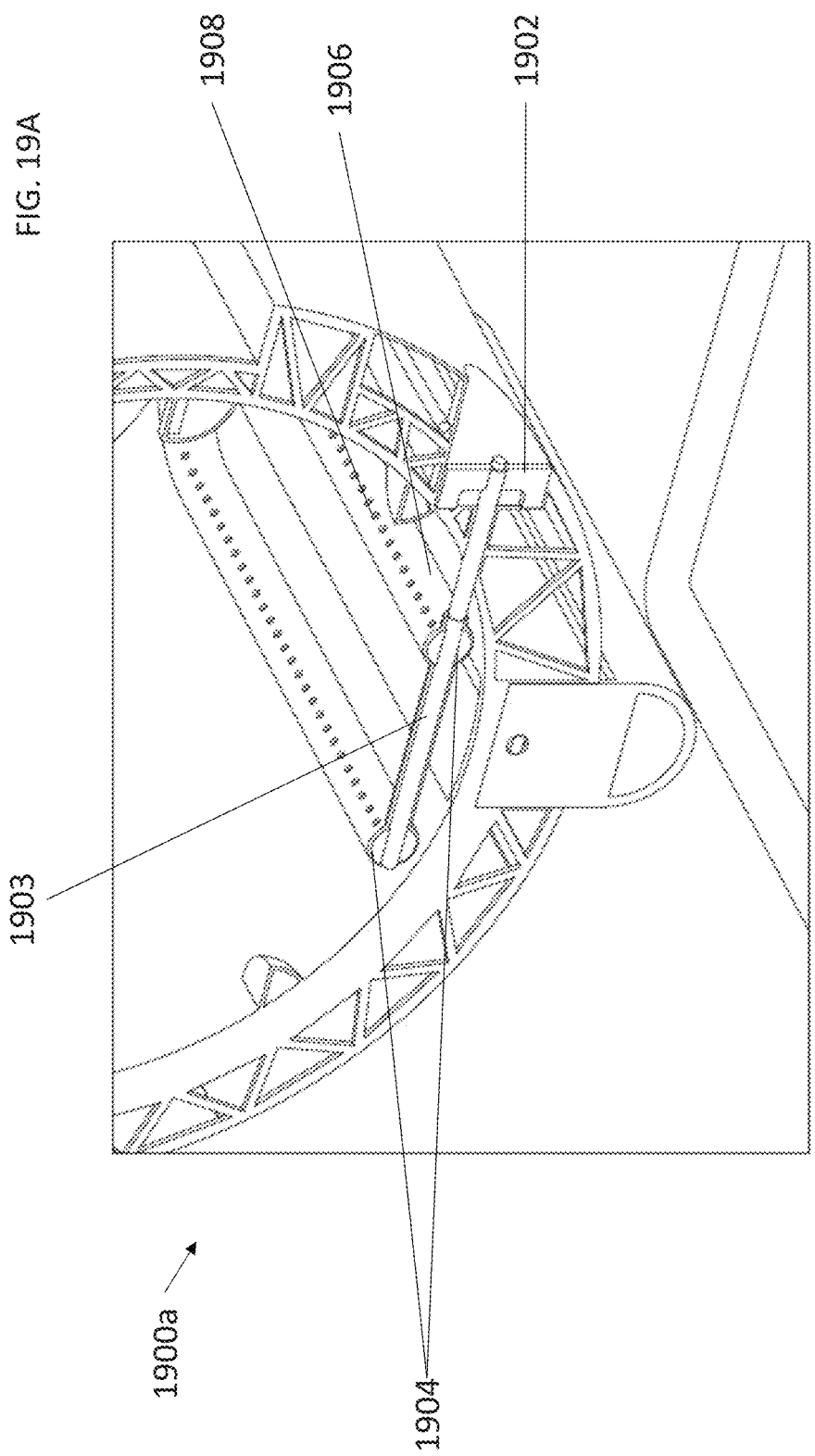
FIG. 19A is a cross-sectional diagram depicting an example embodiment of a modular grill and smoker with closed fuel valves of a fuel line.

FIG. 19A is a cross-sectional diagram 1900a depicting an example embodiment of a modular grill and smoker with closed valve covers 1904. As such, in the example embodiment, when a knob 1902 is turned to a closed position by a user, it closes valve covers 1904 such that they are no longer able to supply fuel via fuel line 1906 to part of the modular grill and smoker. In various embodiments, valve covers 1904 can be for LPG/NG-gas-burner-bifurcation valves that are used to control an amount of fuel provided to a location or area within the modular grill and smoker. This allows users to control disparate cooking-temperature zones within the body of the apparatus. As such, the figures depicted in FIGS. 19A-19D show configurations and components for providing gas or other burner bifurcation control.

Figure 19B:
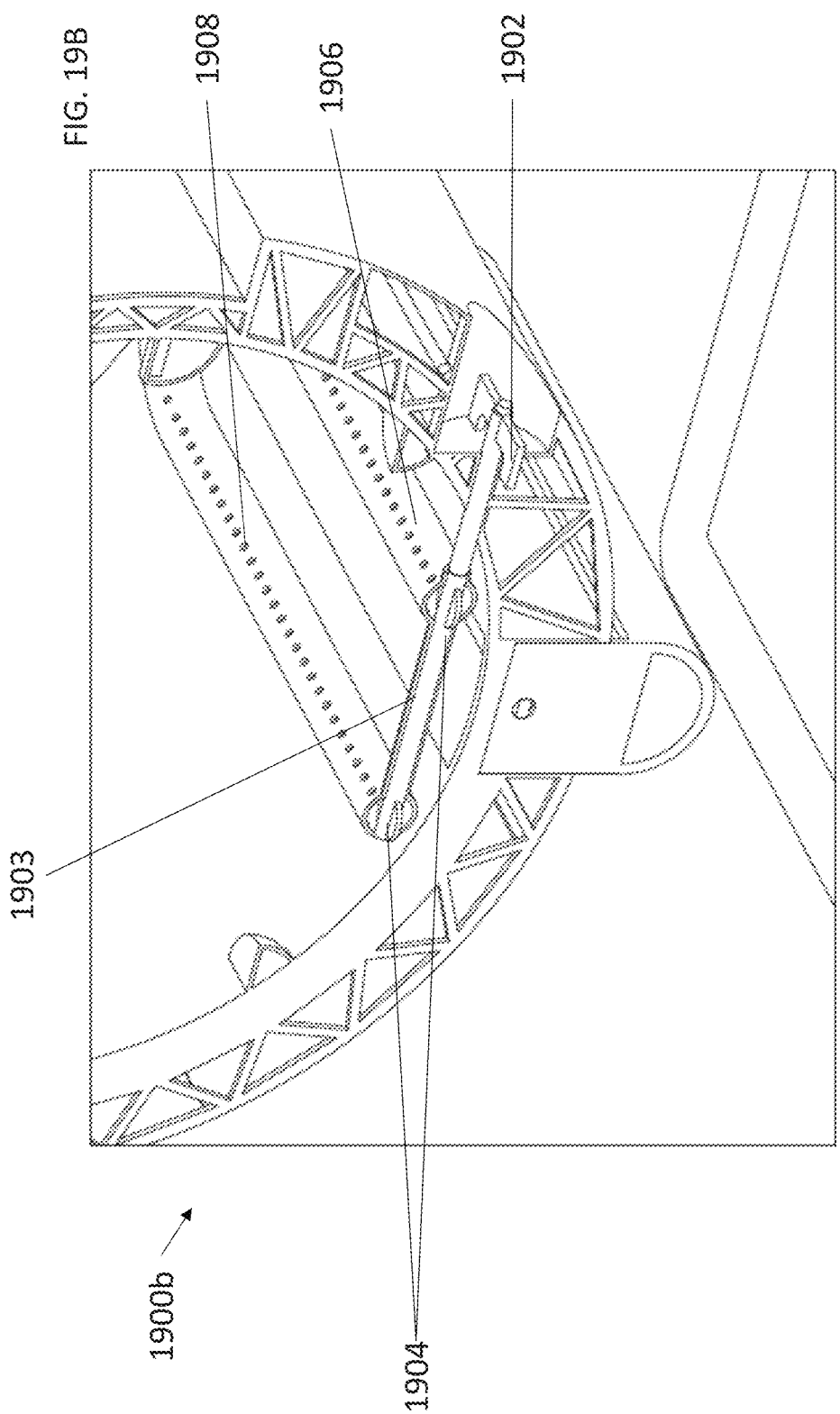
FIG. 19B is a cross-sectional diagram depicting an example embodiment of a modular grill and smoker with open fuel valves of a fuel line.

FIG. 19B is a cross-sectional diagram 1900b depicting an example embodiment of a modular grill and smoker with open valve covers 1904. As such, in the example embodiment, when the knob 1902 is turned to an open orientation by a user, it opens valve covers 1904 such that they are able to supply fuel via fuel line 1906 to part of the modular grill and smoker. Here, the valve covers 1904 are coupled with a rod 1903, that is also coupled to an externally located knob 1902 for operation. When turned or otherwise operated, knob 1902 turns rod 1903 and coupled valve covers 1904 to open and close a LPG/NG-gas-burner-bifurcation mechanism. As such, fuel such as gas traveling through fuel line 1906 can be provided to or blocked from portions of fuel line 1906. In turn, this allows or prevents flames burning from the fuel to exit fuel holes 1908 in the particular portions of fuel line 1906.

Figure 19C:
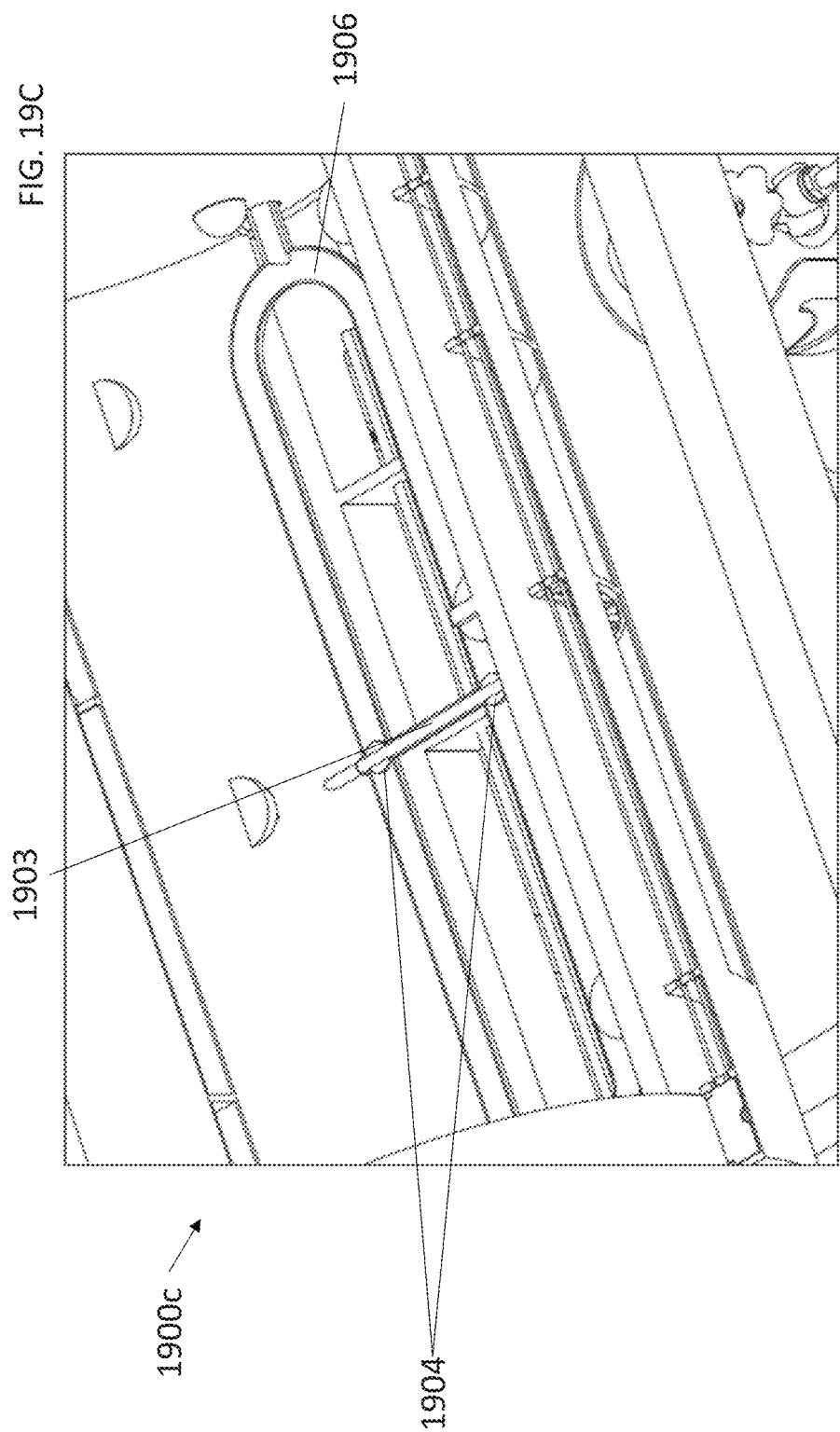
FIG. 19C is a cross-sectional diagram depicting an example embodiment of a modular grill and smoker and internally housed heating components.

FIG. 19C is a cross-sectional diagram 1900c depicting an example embodiment of a modular grill and smoker, including internal heating components such as valve covers 1904, rod 1903 and a cross section of fuel line 1906. As shown in the example embodiment, the top half of fuel line 1906 has been removed in the diagram to show valve covers 1904 in an orientation parallel to an upper and lower surface of fuel line 1906, such that valve covers 1904 are open. When in a closed orientation, valve covers 1904 are perpendicular to a fuel direction flow within fuel line 1906, such that they nearly or fully block a portion of fuel from feeding through a portion of fuel line 1906.

Figure 19D:
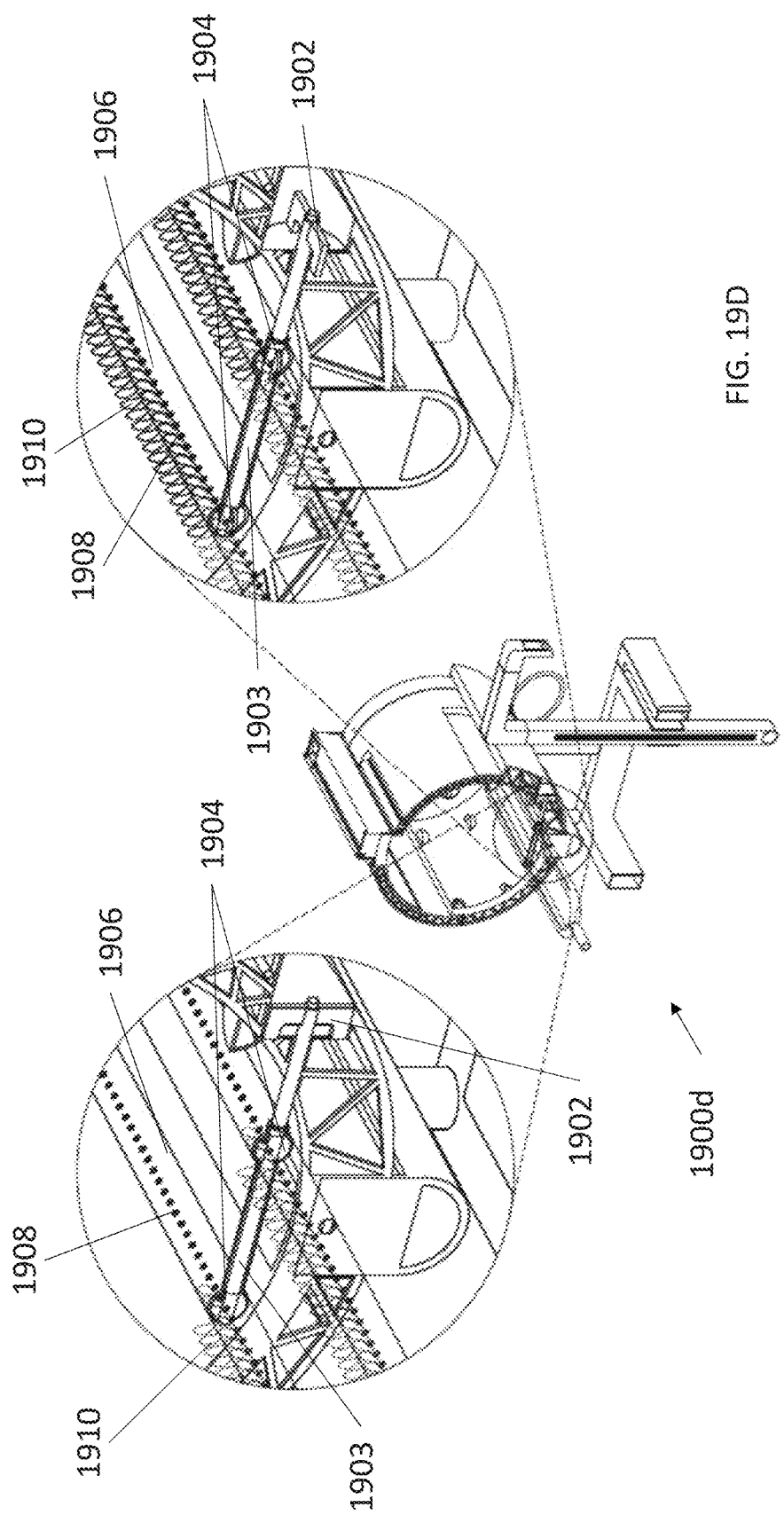
FIG. 19D is a cross-sectional diagram depicting an example embodiment of a modular grill and smoker with enlargements of closed fuel valves of a fuel line and open fuel valves of a fuel line.

FIG. 19D is a cross-sectional diagram 1900d depicting an example embodiment of a modular grill and smoker with a closed valve covers 1904 enlargement on the left and an open valve covers 1904 enlargement on the right. Here, demonstrating closed valve covers 1904 in the left enlargement, no flames 1910 are shown as being emitted from fuel holes 1908 past the location of valve covers 1904 in the closed position. This differs from the open valve covers 1904 shown in the right enlargement, where flames 1910 are shown as being emitted along the length of fuel line 1906.

Various individual materials and combinations thereof are contemplated for fabricating the individual components and structures described herein. In many embodiments marine, stainless and titanium are contemplated. Future developed materials are also contemplated, as appropriate to achieve the objectives described herein. Some particular examples of materials that can be used to create components, portions, and items for modular grills and smokers, supporting racks, and supporting tables include: 316, 316L, 316F, 316N, 316TI stainless steel and titanium, and various other corrosion resistant alloys.

Mounting and placement varies widely in various example embodiments of modular grills and smokers, including and not limited to: balcony railings, walled balconies, tabletops, marine rails or walls (e.g. as may be found on a boat) and numerous others.

As used herein and in the appended claims, the singular forms "a", "an", and "the" include plural referents unless the context clearly dictates otherwise.

The publications discussed herein are provided solely for their disclosure prior to the filing date of the present application. Nothing herein is to be construed as an admission that the present disclosure is not entitled to antedate such publication by virtue of prior disclosure. Further, the dates of publication provided may be different from the actual publication dates which may need to be independently confirmed.

It should be noted that all features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the following description does not explicitly state, in a particular instance, that such combinations or substitutions are possible. It is explicitly acknowledged that express recitation of every possible combination and substitution is overly burdensome, especially given that the permissibility of each and every such combination and substitution will be readily recognized by those of ordinary skill in the art.

In many instances entities are described herein as being coupled to other entities. It should be understood that the terms "coupled" and "connected" (or any of their forms) are used interchangeably herein and, in both cases, are generic to the direct coupling of two entities (without any non-negligible (e.g., parasitic) intervening entities) and the indirect coupling of two entities (with one or more non-negligible intervening entities). Where entities are shown as being directly coupled together, or described as coupled together without description of any intervening entity, it should be understood that those entities can be indirectly coupled together as well unless the context clearly dictates otherwise.

While the embodiments are susceptible to various modifications and alternative forms, specific examples thereof have been shown in the drawings and are herein described in detail. It should be understood, however, that these embodiments are not to be limited to the particular form disclosed, but to the contrary, these embodiments are to cover all modifications, equivalents, and alternatives falling within the spirit of the disclosure. Furthermore, any features, functions, steps, or elements of the embodiments may be recited in or added to the claims, as well as negative limitations that define the inventive scope of the claims by features, functions, steps, or elements that are not within that scope.

What is claimed is:

1. A modular grill and smoker, comprising:
   a heating location;
   a first chamber defined by at least one first chamber wall;
   a second chamber defined by at least one second chamber wall and coupled with the first chamber, wherein the second chamber wall is co-axial with the first chamber wall to define an airflow corridor;
   an inlet vent coupled with the second chamber;
   an outlet vent coupled with the second chamber,
   wherein, the first chamber is operable to cook food by retaining heat generated in the heating location and
   wherein, air located exterior to the second chamber is drawn into the airflow corridor via the inlet vent and is emitted from the airflow corridor via the outlet vent;
   a first transparent or semi-transparent panel removably coupled to the at least one first chamber wall; and
   a second transparent or semi-transparent panel removably coupled to the at least one second chamber wall.

2. The modular grill and smoker of claim 1, wherein the first chamber is substantially cylindrically shaped.

3. The modular grill and smoker of claim 2, wherein the second chamber is substantially cylindrically shaped and is located co-axial with the cylindrically shaped first chamber such that the second chamber at least partially surrounds the first chamber.

4. The modular grill and smoker of claim 1, further comprising:
   an access door coupled with at least the first chamber and operable to provide selective access to an interior of the first chamber.

5. The modular grill and smoker of claim 4, further comprising:
   one or more rotary dampers coupled to the access door.

6. The modular grill and smoker of claim 1, wherein an interior of the first chamber comprises high-temperature ceramic material.

7. The modular grill and smoker of claim 1, further comprising:
   a fuel line mounted in the heating location, operable to provide externally supplied fuel to the heating location; and
   a fuel line control valve with at least one valve cover for preventing fuel from reaching at least one location within the fuel line during operation when the valve cover is in a closed orientation.

8. The modular grill and smoker of claim 1, wherein the second transparent or semi-transparent panel is coupled to the at least one second chamber wall via a cam lock.

9. A grill and smoker system, comprising:
   a modular cooking device, comprising:
   a heating location;
   a first chamber having at least one first chamber wall;
   an inlet vent;
   an outlet vent;
   a second chamber, having at least one second chamber wall being co-axial with the first chamber wall,
   wherein the second chamber is coupled with the first chamber, the inlet vent and the outlet vent such that the second chamber defines an airflow corridor from the inlet vent, to a space between the first chamber wall and second chamber wall, to the outlet vent;
   a first transparent or semi-transparent panel removably coupled to the at least one first chamber wall;
   a second transparent or semi-transparent panel removably coupled to the at least one second chamber wall; and
   wherein the modular cooking device includes at least one weld created using a robotic fabrication system; and
   a support device, operable to couple with the modular cooking device.

10. The grill and smoker system of claim 9, wherein the support device is a support rack, comprising:
    a body frame; and
    an installation arm coupled to the body frame and operable to couple with an installation location; and
    at least one mounting component operable to securely couple with the modular cooking device.

11. The grill and smoker system of claim 10, wherein the support rack further comprises:
    a fuel support arm coupled with the body frame, wherein the fuel support arm is operable to removably couple with an external fuel storage device.

12. The grill and smoker system of claim 10, wherein the support rack comprises at least one of stainless or titanium material designed primarily for marine environments.

13. The grill and smoker system of claim 9, wherein the support device is a support table, comprising:
    at least one support leg;
    a support panel coupled with the at least one support leg and operable to support the modular cooking device; and
    at least one adjustable mounting hook operable to securely couple with the modular cooking device.

14. The grill and smoker system of claim 13, wherein a mounting component is provided on an upper surface of the support panel.

15. The grill and smoker system of claim 9, wherein the second transparent or semi-transparent panel is coupled to the at least one second chamber wall via a cam lock.

* * * * *